US008811512B2

(12) United States Patent
Gorokhov et al.

(10) Patent No.: US 8,811,512 B2
(45) Date of Patent: *Aug. 19, 2014

(54) METHODS AND APPARATUS FOR MEASURING, COMMUNICATING AND/OR USING INTERFERENCE INFORMATION

(75) Inventors: Alexei Yurievitch Gorokhov, San Diego, CA (US); Aamod Dinkar Khandekar, San Diego, CA (US); Ravi Palanki, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,578

(22) Filed: Sep. 28, 2010

(65) Prior Publication Data
US 2011/0019770 A1  Jan. 27, 2011

Related U.S. Application Data

(63) Continuation of application No. 11/766,353, filed on Jun. 21, 2007.

(60) Provisional application No. 60/816,281, filed on Jun. 23, 2006, provisional application No. 60/815,664, filed on Jun. 21, 2006, provisional application No. 60/815,773, filed on Jun. 22, 2006.

(51) Int. Cl.
*H04B 7/02* (2006.01)
*H04L 1/02* (2006.01)

(52) U.S. Cl.
USPC .................. 375/267; 375/295; 375/316

(58) Field of Classification Search
USPC .................. 375/260, 267, 269, 316, 295
See application file for complete search history.

(56) References Cited

U.S. PATENT DOCUMENTS 6,377,809 B1  4/2002  Rezaiifar et al.
6,606,485 B1  8/2003  Chen et al.
(Continued)

FOREIGN PATENT DOCUMENTS

EP  1359774  6/2006
JP  2005102210 A  4/2005
(Continued)

OTHER PUBLICATIONS

Tomcik, MBFDD and MBTDD Wideband MOde: Technology Overview, Jan. 2006, pp. 1-109.*
(Continued)

*Primary Examiner* — Chieh M Fan
*Assistant Examiner* — Freshteh N Aghdam
(74) *Attorney, Agent, or Firm* — Donald C. Kordich

(57) ABSTRACT

Wireless communications methods and apparatus are described. A communications apparatus, e.g., a base station, measures interference information, e.g., other sector interference information. The communications apparatus generates a preamble which includes a plurality of pilot symbols and at least one of the pilot symbols includes interference information. In some embodiments, the preamble is part of a superframe structure, e.g., a recurring superframe structure, including the preamble and a plurality of frames, at least some of the frames used to convey traffic data. The communications apparatus transmits the preamble, thus broadcasting the interference information to access terminals in the vicinity. An access terminal receives the preamble including a plurality of pilot signals, at least one of the pilot signals including interference information. The access terminal recovers the interference information from the received preamble and controls signal transmission based on the recovered interference information.

78 Claims, 15 Drawing Sheets

(56) References Cited

U.S. PATENT DOCUMENTS

| | | | |
|---|---|---|---|
| 6,891,812 B2 | 5/2005 | Bender | |
| 6,915,473 B2 | 7/2005 | Bolourchi et al. | |
| 6,928,066 B1 | 8/2005 | Moon et al. | |
| 7,016,319 B2 | 3/2006 | Baum et al. | |
| 7,042,957 B1 | 5/2006 | Zirwas | |
| 7,120,166 B2 | 10/2006 | McFarland et al. | |
| 7,227,854 B2 | 6/2007 | Kim et al. | |
| 7,706,352 B2 * | 4/2010 | Rinne et al. | 370/350 |
| 2002/0015405 A1 | 2/2002 | Sepponen et al. | |
| 2002/0138721 A1 | 9/2002 | Kwon et al. | |
| 2005/0094615 A1 | 5/2005 | Kim et al. | |
| 2005/0163265 A1 | 7/2005 | Gupta et al. | |
| 2005/0195758 A1 | 9/2005 | Chitrapu | |
| 2005/0286482 A1 | 12/2005 | Rajkotia | |
| 2006/0002451 A1 | 1/2006 | Fukuta et al. | |
| 2006/0018258 A1 | 1/2006 | Teague et al. | |
| 2006/0024541 A1 | 2/2006 | Weiss et al. | |
| 2006/0025079 A1 * | 2/2006 | Sutskover et al. | 455/67.11 |
| 2006/0188003 A1 | 8/2006 | Larsson | |
| 2006/0221810 A1 | 10/2006 | Vrcelj et al. | |
| 2006/0256708 A1 | 11/2006 | Wang et al. | |
| 2007/0047495 A1 | 3/2007 | Ji et al. | |
| 2007/0201398 A1 | 8/2007 | Yang et al. | |
| 2007/0202816 A1 | 8/2007 | Zheng | |
| 2007/0297379 A1 | 12/2007 | Gorokhov et al. | |
| 2008/0043879 A1 | 2/2008 | Gorokhov et al. | |
| 2008/0056183 A1 | 3/2008 | Gorokhov et al. | |
| 2011/0255522 A9 | 10/2011 | Gorokhov et al. | |

FOREIGN PATENT DOCUMENTS

| | | |
|---|---|---|
| KR | 20020034651 | 5/2002 |
| KR | 20020034818 | 9/2002 |
| RU | 2154901 | 8/2000 |
| RU | 2185031 | 7/2002 |
| RU | 2207723 C1 | 6/2003 |
| RU | 2238611 C1 | 10/2004 |
| WO | WO2005104589 A1 | 11/2005 |
| WO | WO2005104689 A2 | 11/2005 |

OTHER PUBLICATIONS

Bellec M et al: "A PHY/MAC Proposal for IEEE 802.22 WRAN Systems—Part 1: The PHY," doc.: IEEE 802.22-06/0004r0 Internet Citation, [online] Jan. 11, 2006, SP007902868, pp. 1-34.
Chellali A et al., "Computational reduction during idle transmission in DSL modems", Acoustics, Speech and Signal Processing 1998. Proceedings of the 1998 IEEE Internationla Conference on Seattle, WA, May 12-15, 1998, vol. 6, pp. 3441-3444.
Choi S.H. et al., "Method and apparatus for confirming multiple frame structure and indicating transmission diversity through phase modulation of forward pilot time slot in nb-tdd dmna communication system", Database WPI May 9, 2002, pp. 1-3.
Ericsson: "Discussion on HS-SCCH misdetection performance and provision of a UE-Id on HS-DSCH" 3GPP Draft; R2-030337, 3rd Generation Partnership Project (3GPP), Mobile Competence Centre; 650, Route Des Lucioles;: F-06921 Sophia-Antipolis Cedex; France, vol. RAN WG2, no. Sophia Antipolis, France; 20030214, Feb. 14, 2003, XP050122984 [retrieved on Feb. 14, 2003].
Ericsson: "Discussion on HS-SCCH misdetection probability" 3GPP Draft; R1-030351, 3rd Generation Partnership Project (3GPP), Mobile Competence Centre; 650, Route Deslucioles ; F-06921 Sophia-Antipolis Ceoex ; France, vol. RAN WG1, no. Tokyo; 20030221, Feb. 21, 2003, XP050097449 [retrieved on Feb. 21, 2003].
International Search Report—PCT/US07/071821—International Search Authority, European Patent Office—Feb. 20, 2008.
Jondral FK et al.: "Spectrum pooling: an innovative strategy for the enhancement of spectrum efficiency" IEEE Communications Magazine, IEEE Service Center, Piscataway, US, vol. 42, No. 3, Mar. 2004, pp. S8-S14.
Khalona R. (Nextwave Broadband): "Next Broadband WRAN proposal outline" doc.: IEEE 802.22-05/0091r0, [online] Nov. 7, 2005, XP002456664, pp. 1-19.
Lucent Technologies: "Comparison of schemes for UE Specific CRC" 3GPP Draft; R1-02-0076 UESPCRC, 3rd Generation % Partnership Project (3GPP), Mobile Competence Centre ; 650, Route Des Lucioles ; F-06921 Sophia-Antipolis Cedex ; France, vol. RAN WG1, no. Espoo, Finland; 200201 12, Jan. 12, 2002, XP050095659 [retrieved on Jan. 2002-1 21.
Poston J D et al.; "Discontiguous OFDM considerations for dynamic spectrum access in idle TV channels" New Frontiers in Dynamic Spectrum Access Networks, 2005. Dyspan 20056. 2005 First IEEE International Symposium on Baltimore, MD, USA Nov. 8-11, 2005, pp. 607-610.
Rapporteur: "TR 25.858 v 0.1.2" 3GPP Draft; R1-01-1343-REV1, 3rd Generation Partnership Project (3GPP), Mobile Competence Centre ; 650, Route Des Lucioles ; F-06921 Sophia-Antipolis Cedex ; France, vol. RAN WG1, no. Espoo, Finland; 200201 06, Jan. 6, 2002, XP050095584.
Russian Explanatory Dictionary of Radio Electronics (P.K. Gorokhov, Moscow, 1993, p. 93).
Siemens: "Improved UE Specific CRC Generation" Apr. 15, 2002, 3GPP Draft; R1-02-0493 (UE Specific CRC Generation), 3rd Generation Partnership Project (3GPP), Mobile Competence Centre; 650, Route Des Lucioles; F-06921 Sophia-Antipolis Cedex; France, XP050096088 [retrieved on Apr. 15, 2002].
Tomcik, Jim: "QFDD Technology Overview Presentation," IEEE 802.20 Working Group on Mobile Broadband Wireless Access, [Online] Nov. 15, 2005, pp. 1-73, XP002467626.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Written Opinion—PCT/US07/071821—International Search Authority, European Patent Office—Feb. 20, 2008.
ETSI 3GPP TS 25.222 "3rd Generation Partnership Project; Technical Specification Group Radio Access Network; Multiplexing and channel coding (TDD)," Release 7, Mar. 2006.
Taiwan Search Report—TW096122420—TIPO—May 17, 2012.
Schaefer, D.J. "Wide area adaptive spectrum applications", Military Communications Conference ,2001. MILCOM 2001.Communications for Network-Centric Operations: Creating the Information Force.IEEE, Oct. 31, 2001.

* cited by examiner

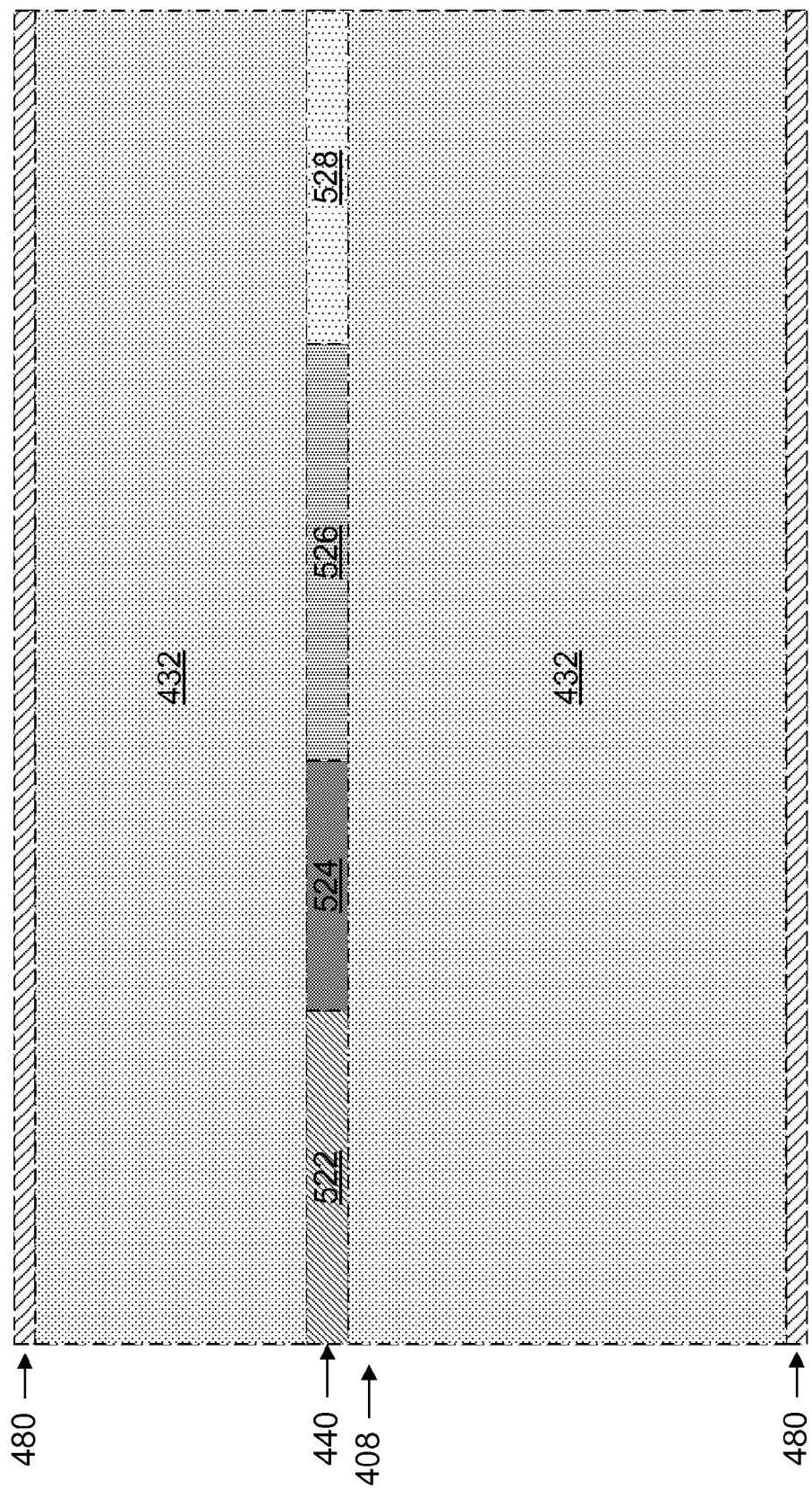

METHODS AND APPARATUS FOR MEASURING, COMMUNICATING AND/OR USING INTERFERENCE INFORMATION

RELATED APPLICATIONS

The present application is a Continuation of U.S. patent application Ser. No. 11/766,353 filed Jun. 21, 2007, titled "METHODS AND APPARATUS FOR MEASURING, COMMUNICATING AND/OR USING INTERFERENCE INFORMATION, which claims the benefit of U.S. Provisional Patent Application Ser. No. 60/816,281 filed on Jun. 23, 2006, titled "ULTRA-HIGH DATA RATE (UHDR) FOR MOBILE BROADBAND WIRELESS ACCESS"; U.S. Provisional Patent Application Ser. No. 60/815,664 filed on Jun. 21, 2006, titled "BANDWIDTH ALLOCATION FOR WIRELESS COMMUNICATION SYSTEM"; and U.S. Provisional Patent Application Ser. No. 60/815,733 filed on Jun. 21, 2006, titled "SUPERFRAME STRUCTURE FOR WIRELESS COMMUNICATION SYSTEM" each of which is hereby expressly incorporated by reference.

FIELD

Various embodiments are directed to wireless communication methods and apparatus, and more particularly, to communicating and/or using interference information.

BACKGROUND

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can be used in all or a portion of sequential time slices or time slots. Each user may be provided with one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

Methods and apparatus for communicating and/or using interference information would facilitate efficient use of bandwidth. Accordingly there is a need for new and/or improved methods of efficiently communicating interference information and, optionally, new method of using communicated interference information.

SUMMARY

Wireless communications methods and apparatus are described which efficiently communicate control information including interference information. A communications apparatus, e.g., a base station, measures interference information, e.g., other sector interference information. The communications apparatus generates a preamble which includes a plurality of pilot symbols. In some embodiments at least one of the pilot symbols includes interference information. In some embodiments, the preamble is part of timing/frequency structure, e.g., a recurring super-frame structure, including the preamble and a plurality of subsequent frames. In some embodiments some of the subsequent frames are used to convey traffic data. The preamble is, in some embodiments, a small contiguous block of OFDM symbols used for conveying pilot signals, system configuration and/or paging information, and at least one of the pilot symbols carries interference information. The communications apparatus transmits the preamble, thus broadcasting the interference information to access terminals in the vicinity, which can utilize such information to make informed transmission control decisions.

An access terminal receives the preamble including a plurality of pilot symbols, at least one of the pilot symbols including interference information. For example, the interference information is, in some embodiments, carried via a pilot OFDM symbol or symbols. The interference information can be carried via an other sector interference channel corresponding to all or part of one or more OFDM pilot symbols. In one such embodiment, a pilot OFDM symbol which identifies the sector of the transmitter, is used to carry the other sector interference information. Thus an OFDM symbol that carries information identifying the source of the pilot symbol transmission also carries interference information corresponding to other sectors in some but not necessarily all embodiments. In one exemplary embodiment, the interference information is communicated by the value of a phase offset multiplier that has been used in generating the pilot symbol.

The access terminal recovers the interference information from the received preamble and controls signal transmission based on the recovered interference information. Some exemplary signal transmission control operations, in response to recovered interference information include: refraining from transmitting, adjusting transmission power level, and adjusting data rate.

An exemplary method of operating a communications apparatus, e.g., a base station or access point, in accordance with some embodiments comprises: measuring interference; and transmitting a preamble, said preamble including a plurality of pilot symbols, at least one of said pilot symbols including interference information. An exemplary wireless communications apparatus in accordance with some embodiments comprises: an interference measurement module; and a preamble generation module for generating a preamble, said preamble including a plurality of pilot symbols, at least one of said pilot symbols including interference information.

An exemplary method of operating an access terminal, in accordance with some embodiments, comprises: receiving a preamble, said preamble including a plurality of pilot symbols, at least one of said pilot symbols including interference information; recovering interference information from the received preamble; and controlling signal transmission based on the recovered interference information. An exemplary access terminal in accordance with some embodiments comprises: a receiver module for receiving a preamble, said preamble including a plurality of pilot symbols, at least one of said pilot symbols including interference information; an interference information recovery module for recovering interference information from the received preamble; and a transmission control module for controlling signal transmission based on the recovered interference information.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 5B illustrates aspects of a reverse link frame for a multiple access wireless communication system

DETAILED DESCRIPTION

Figure 1:
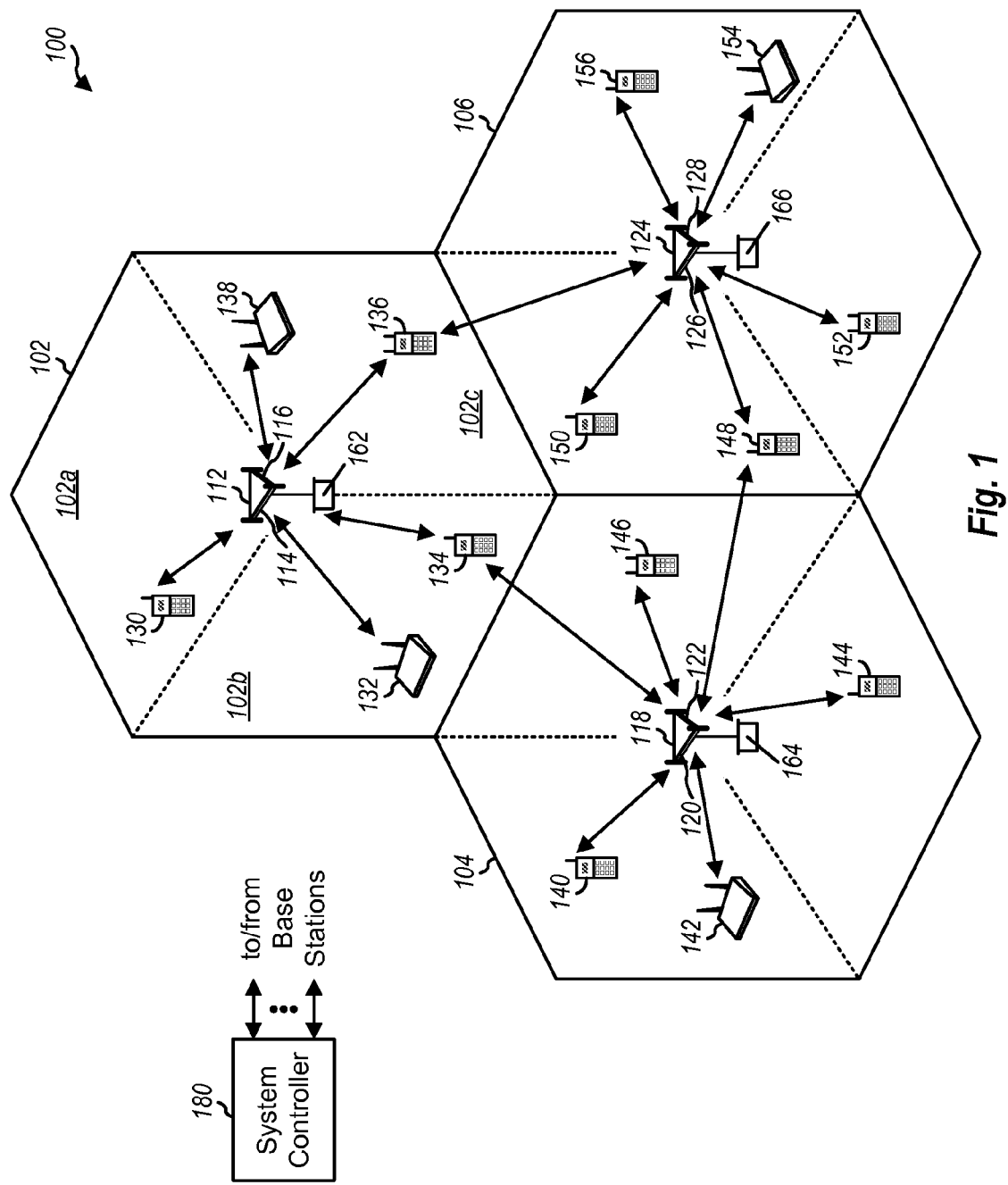
FIG. 1 illustrates aspects of a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system 100 according to one embodiment is illustrated. A multiple access wireless communication system 100 includes multiple cells, e.g. cells 102, 104, and 106. In the embodiment of FIG. 1, each cell (102, 104, and 106) may include an access point (162, 164, 166), respectively, that includes multiple sectors. For example cell 102 includes a first sector 102a, a second sector 102b and a third sector 102c. The multiple sectors are formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which are in communication with one or more sectors of each access point. For example, access terminals 130, 132, 134, 136 and 138 are in communication access point 162; access terminals 140, 142, 144, 146, 148 and 134 are in communication with access point 164; and access terminals 136, 148, 150, 152, 154 and 156 are in communication with access point 166.

Controller 180 is coupled to each of the cells 102, 104, and 106. Controller 180 may contain one or more connections to multiple networks, e.g. the Internet, other packet based networks, or circuit switched voice networks that provide information to, and from, the access terminals in communication with the cells of the multiple access wireless communication system 100. The controller 180 includes, or is coupled with, a scheduler that schedules transmission from and to access terminals. In other embodiments, the scheduler may reside in each individual cell, each sector of a cell, or a combination thereof.

Each of the sectors can operate utilizing one or more of a plurality of carriers. Each carrier is a portion of a larger bandwidth in which the system can operate, or is available for communication. A single sector utilizing one or more carriers may have multiple access terminals scheduled on each of the different carriers during any given time interval, e.g. frame or superframe. Further, one or more access terminals may be scheduled on multiple carriers simultaneously.

An access terminal may be scheduled in one carrier or more than one carrier according to its capabilities. These capabilities may be part of the session information that is generated when the access terminal attempts to acquire communication or that has been negotiated previously, may be part of the identification information that is transmitted by the access terminal, or be established according to any other approach. In certain aspects, the session information may comprise a session identification token that is generated by querying the access terminal or determining its capabilities through its transmissions.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a wireless terminal, a mobile station, a mobile node, a mobile or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors.

Figure 2A:
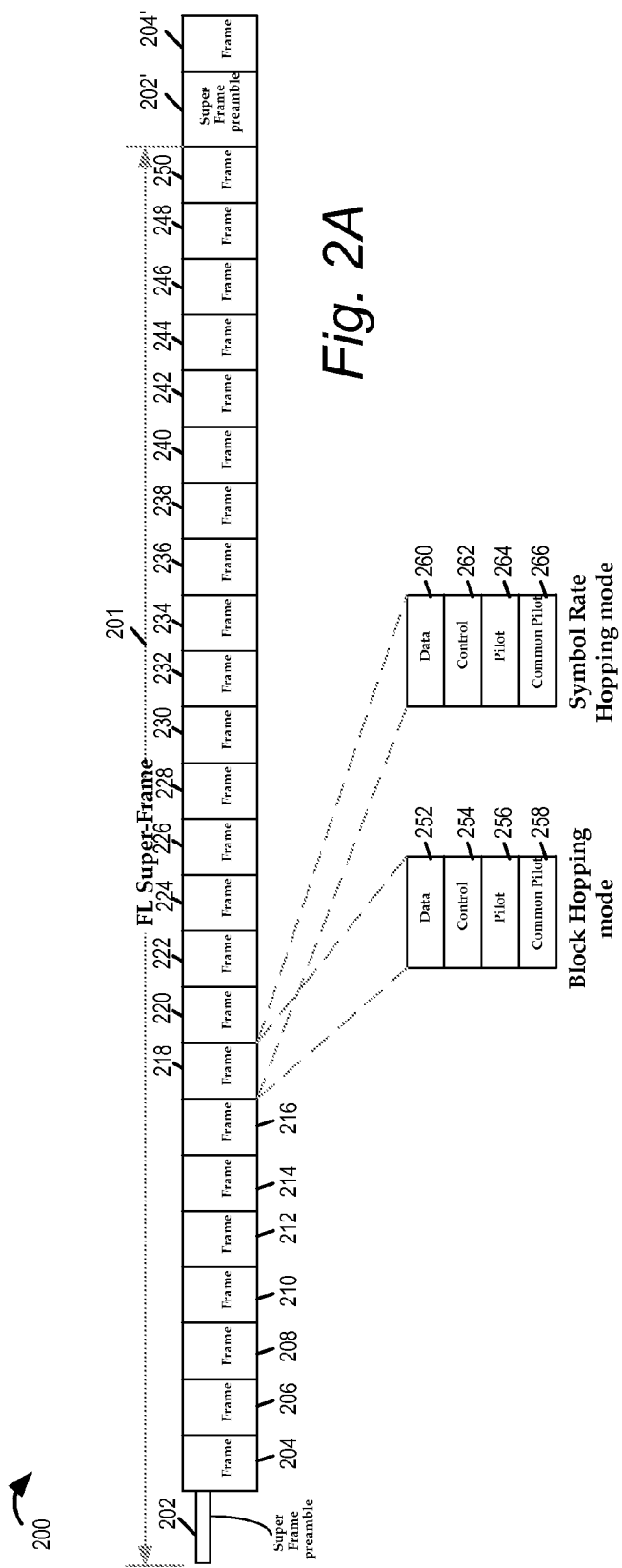
FIGS. 2A and 2B illustrate aspects of superframe structures for a multiple access wireless communication system.
Figure 2B:
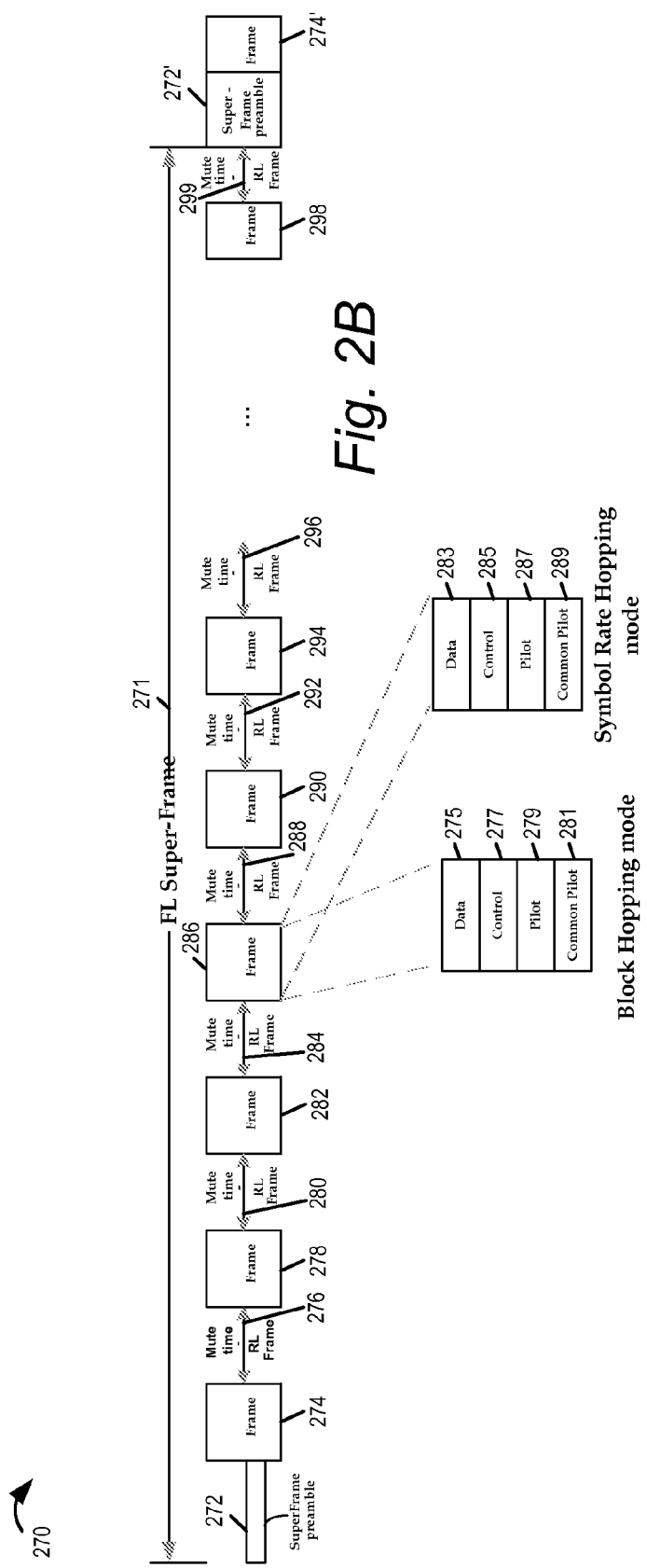

Referring to FIGS. 2A and 2B, aspects of superframe structures for a multiple access wireless communication system are illustrated. FIG. 2A illustrates aspects of superframe structures for a frequency division duplexed (FDD) multiple access wireless communication system, while FIG. 2B illustrates aspects of superframe structures for a time division duplexed (TDD) multiple access wireless communication system. The superframe preamble is transmitted at the beginning of each superframe, or may be interspersed within the superframe itself, e.g. a preamble and a midamble.

In both FIGS. 2A and 2B, the forward link transmission is divided into units of superframes. A superframe may comprise a superframe preamble followed by a series of frames. In an FDD system, the reverse link and the forward link transmission may occupy different frequency bandwidths so that transmissions on the links do not or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may vary within a given superframe or between superframes.

Drawing 200 of FIG. 2A illustrates exemplary forward link super frame 201 which includes super frame preamble 202 followed by frames (204, 206, 208, 210, 212, 214, 216, 218, 220, 222, 224, 226, 228, 230, 232, 234, 236, 238, 240, 242, 244, 246, 248 and 250). An initial portion of another forward link superframe is illustrated including a super frame preamble 202' followed by a frame 204'. An exemplary frame, e.g., frame 218, in an exemplary block hopping mode includes a data portion 252, a control portion 254, a pilot portion 256, and a common pilot portion 258. An exemplary frame, e.g., frame 218, in an exemplary symbol rate hopping mode includes a data portion 260, a control portion 262, a pilot portion 264, and a common pilot portion 266.

Drawing 270 of FIG. 2B illustrates exemplary forward link super frame 271 which includes super frame preamable 272 followed by a sequence of frames utilized for forward link signaling and mute time intervals reserved for reverse link frames (frame 274, mute time 276, frame 278, mute time 280, frame 282, mute time 284, frame 286, mute time 288, frame 290, mute time 292, frame 294, mute time 296, . . . , frame 298, mute time 299. An initial portion of another forward link superframe is illustrated including a super frame preamble 272' followed by a frame 274'. An exemplary frame, e.g., frame 286, in an exemplary block hopping mode includes a data portion 275, a control portion 277, a pilot portion 279, and a common pilot portion 281. An exemplary frame, e.g., frame 286, in an exemplary symbol rate hopping mode includes a data portion 283, a control portion 285, a pilot portion 287, and a common pilot portion 289.

In both FDD and TDD systems each superframe may comprise a superframe preamble. In certain embodiments, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate and basic power control or offset information may also be included in the superframe preamble. In other cases, only some of the above and/or other information may be included in this superframe preamble.

In an aspect, the following information may be included in the superframe preamble: (i) a common pilot channel; (ii) a broadcast channel, including system and configuration information; (iii) an acquisition pilot channel, used to acquire timing and other information; and (iv) an other sector interference channel, including indicators from the sector of its measured interference with respect to other sectors.

Further, in certain aspects messages for channels in the superframe preamble may span multiple superframe preambles of different superframes. This may be utilized to improve decoding capability by allocating greater resources to certain high priority messages.

As shown in FIGS. 2A and 2B, the superframe preamble is followed by a sequence of frames. Each frame may include the same or a different number of OFDM symbols, which may constitute a number of subcarriers that may simultaneously be utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Figure 3:
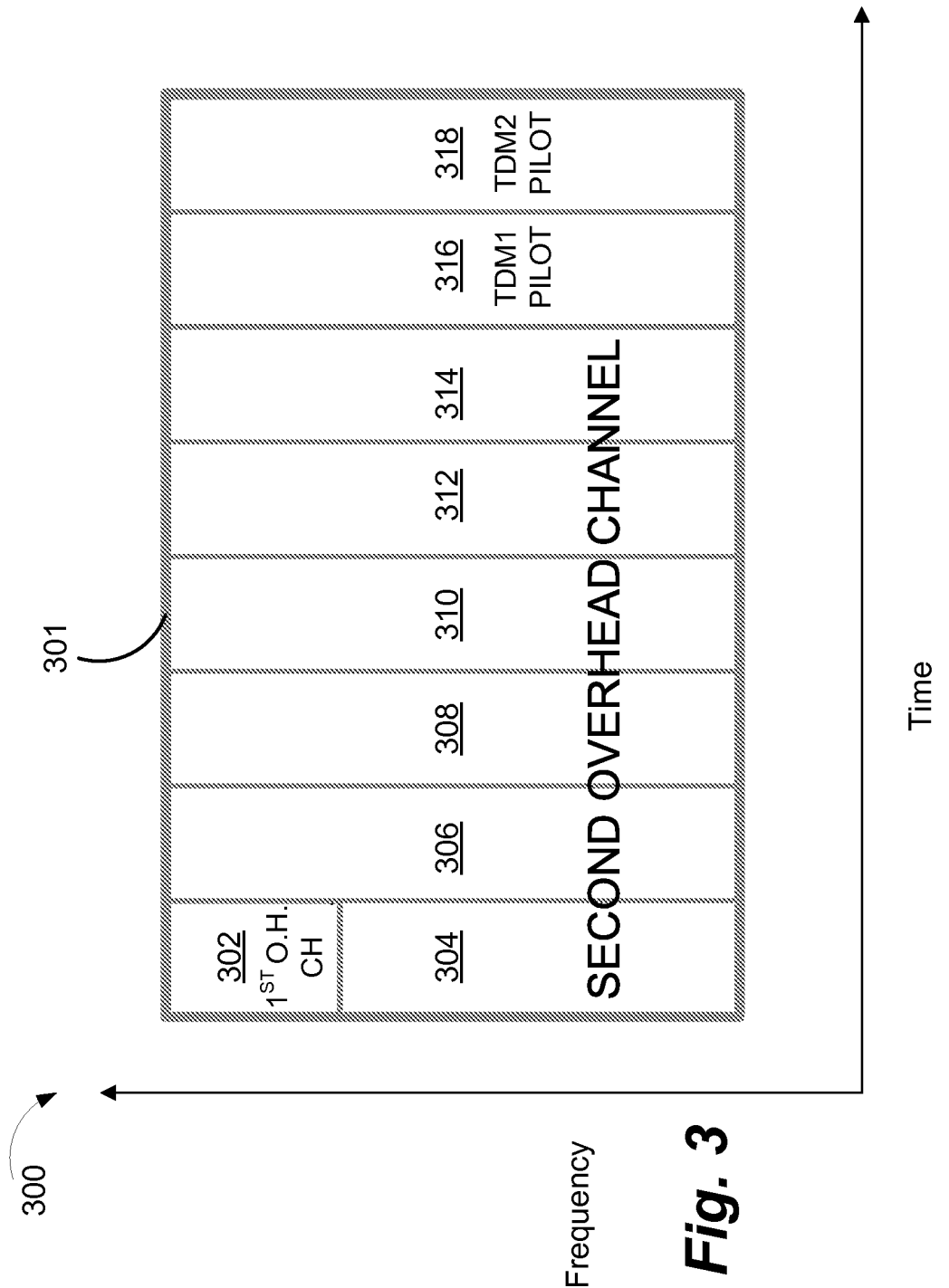
FIG. 3 is a drawing which illustrates aspects of an exemplary superframe preamble for an exemplary wireless communication system.

FIG. 3 is a drawing 300 of frequency vs time which illustrates aspects of an exemplary superframe preamble 301 for a wireless communication system. The bandwidth spanned by the superframe preamble may be, in one or more aspects, 1.25 MHz. In other aspects, it may be 2.5 MHz, 5 MHz or some other bandwidth.

In FIG. 3, a superframe preamble 301 carries a first overhead channel, comprising a first portion 302 of an OFDM symbol, and a second overhead channel, comprising a second portion 304 of said OFMD symbol and OFDM symbols 306, 308, 310, 312, 314. The first overhead channel carries deployment-wide static parameters, e.g. a cyclic prefix duration, number of guard subcarriers, and the superframe index. In an aspect, the first overhead channel is used for initial wakeup. In additional aspects, the first overhead channel may be coded over a plurality of superframes, e.g., 16 superframes.

The second overhead channel carries sufficient information to enable an access terminal to demodulate forward link information, e.g. data transmissions, contained in the forward link frames. In other aspects, the second overhead channel may include information related to hopping patterns, pilot structure, control channel structure, transmit antennas, etc. In some aspects, the second overhead channel may be transmitted every alternate superframe, with superframes not including the second overhead channel being used to carry paging messages. In further aspects. The second overhead channel may carry information on reverse link hopping patterns, channel mapping, transmit powers, power control parameters, access parameters, etc.

By providing the above information in the first and second overhead channels, the system may be able to dynamically configure the cyclic prefix, number of antennas, and pilot structure, etc. Further, this may support forward link and reverse link control channels with flexible overhead, which can be matched to the current loading.

In an aspect, the superframe preamble may utilize three acquisition pilots. In FIG. 3, only two pilots TDM1 316 and TDM2 318 are shown. In some aspects, TDM1 316 is a periodic PN sequence with four periods, where every fourth tone is populated in the frequency domain. In certain aspect, each sector of an access terminal transmits the same sequence for TDM1 316.

In an aspect, TDM2 318 is scrambled with a time-domain sector-dependent sequence. In certain aspects the time-domain sequences may have a low peak-to-average ratio (PAR) and allow for power boosting with respect to traffic signals, as needed. In some aspects, the sequences are chosen to be Walsh sequences with pseudo-noise (PN) scrambling. In certain aspects, the Walsh sequences are correlated at the receiver using a Fast Hadamard Transform. In further aspects 512 Walsh sequences may be used for 512 different sector identifications to be utilized.

In some aspects, one or more subcarriers of TDM2 318 may be used to carry indications of interference from other sectors. For example, 1 or more bits of information to instruct varying power by the access terminal may be utilized.

In certain aspects, pilots TDM1 316 and TDM2 318 may be used in situations where sectors are synchronous or substantially synchronous, or when sectors are asynchronous. In the case of synchronous or substantially synchronous systems, the pilots may change from superframe to superframe. Further, different sectors may use offsets of the same sequence to provide further improvements to the ability to distinguish pilots of different sectors. Further, synchronization at the symbol/chip level is not required to implement this. In aspects, in an asynchronous system the pilots may be the same from superframe to superframe and there is no synchronization requirement between sectors.

A third pilot may be added to extend beyond the superframe preamble. It should be noted that subcarriers and symbol location of the first overhead channel, the second overhead channel, and the pilots may vary and need not be exactly like shown in FIG. 3. Further, while each, other than the first overhead channel, is shown as occupying an entire OFDM symbol this need not be the case and less than all of the subcarriers may be utilized on a given OFDM symbol.

Figure 4:
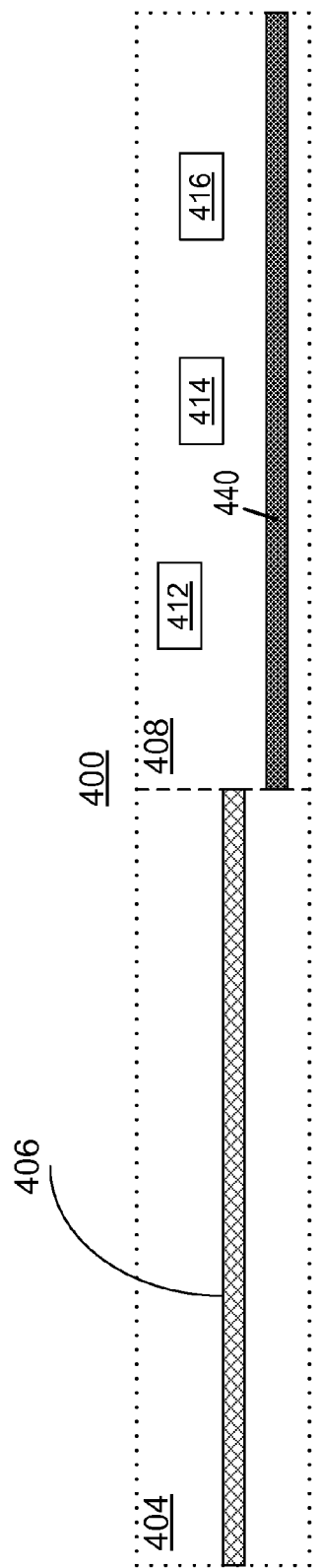
FIG. 4 illustrates aspects of frame structures for a multiple access wireless communication system.

Referring to FIG. 4, aspects of a channel structure for a multiple access wireless communication system are illustrated. A bandwidth 400, which may be a virtual bandwidth containing multiple discontinuous portions, is available for communication according to system design parameters. The structure includes one or more forward link frames 404 and reverse link frames 408, each of which may be part of one or more superframes as discussed with respect to FIG. 2A and/or FIG. 2B.

Each forward link frame 404 includes control channels 406. Each of the control channels 406 may include information for functions related to, for example, acquisition; acknowledgements; forward link assignments for each access terminal, which may be different or the same for broadcast, multicast, and unicast message types, reverse link assignments for each access terminal; reverse link power control for each access terminal; and reverse link acknowledgements. It should be noted that more or fewer of such functions may be supported in control channels 406. Also, the control channels 406 may hop in each frame according to hopping sequences that are the same or different from hopping sequences assigned to data channels.

Each reverse link frame 408 includes a number of reverse link transmissions, e.g. 412, 414, and 416 from access terminals. In FIG. 4, a reverse link transmission is depicted as being a block, i.e. a group of contiguous OFDM symbols. It should be noted that symbol rate hopping, e.g. non contiguous symbol blocks may also be utilized.

In addition, each reverse link frame 408 may include one more reverse link control channels 440, which may include feedback channels; pilot channels for reverse link channel estimation, and acknowledgment channels that may be included in the reverse link transmission 412, 414, 416. Each of the reverse link control channels 440 may include information for functions related to, for example, forward link and reverse link resource requests by each access terminal; channel information, e.g. channel quality information (CQI) for different types of transmission; and pilots from the access terminals that may be used by the access point for channel estimation purposes. It should be noted that more or fewer of such functions may be supported in control channels 440. Also, the reverse link control channels 440 may hop in each frame according to hopping sequences that are the same or different from hopping sequences assigned to data channels.

In certain aspects, to multiplex users on the reverse link control channels 440 one or more orthogonal codes, scrambling sequences, or the like may be utilized to separate each user and/or different types of information transmitted in the reverse link control channels 440. These orthogonal codes may be user specific or may be allocated by the access point to each access terminal per communication session or shorter period, e.g. per superframe.

Additionally, in certain aspects, some of the available subcarriers in an OFDM symbol may be designated as guard subcarriers and may not be modulated, i.e., no energy is transmitted on these subcarriers. The number of guard subcarriers in the superframe preamble and in each frame may be provided via one or more messages in the control channels 406 or superframe preamble.

Further, in some aspects, in order to reduce overhead transmission to a particular terminal, a packet may be jointly encoded for that access terminal, even if the symbols of the packets are to be transmitted over subcarriers. In this way a single cyclic redundancy check may be utilized for the packet and the transmissions that include symbols from these packets are not subject to overhead transmissions of cyclic redundancy checks.

It should be noted that the bandwidth 400 may comprise discontinuous subcarriers and need not be adjacent. In such aspects, the control channels may be limited to less than all of the portions of a carrier, randomly placed amongst the portions, or scheduled amongst the portions in some sort of deterministic fashion.

Figure 5A:
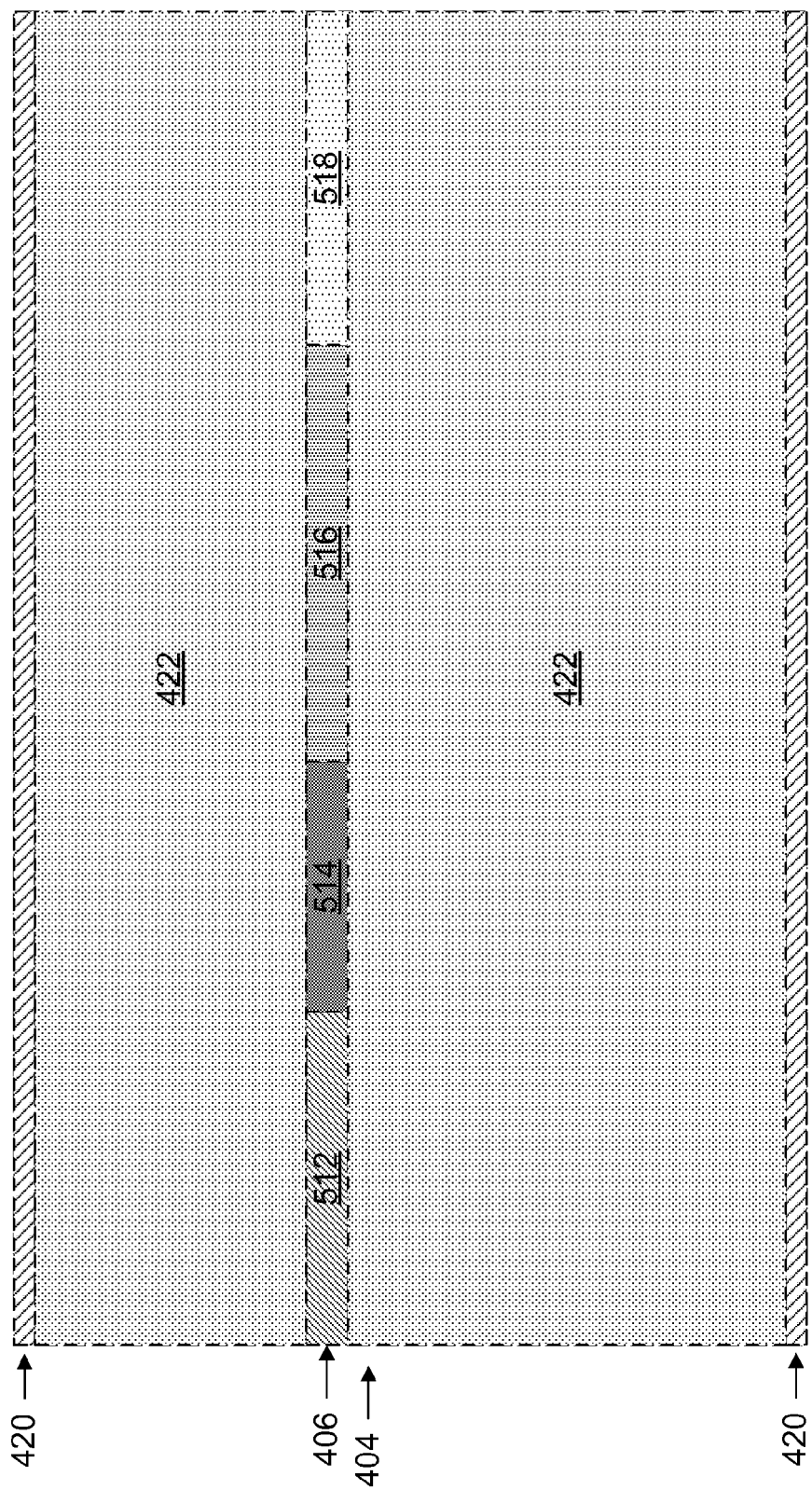
FIG. 5A illustrates aspects of a forward link frame for a multiple access wireless communication system.

Referring to FIG. 5A, aspects of a forward link frame for a multiple access wireless communication system are illustrated. As shown in FIG. 5A, each forward link frame 404 is further divided into two segments. The first, a control channel 406, which may or may not comprise a contiguous group of subcarriers, has a variable number of subcarriers assigned depending on the desired amount of control data and other considerations. The remaining portions 422 are generally available for data transmission. Control channel 406 may include one or more pilot channels 512 and 514. In symbol rate hopping mode, the pilot channels may be present on each of the OFDM symbols in each forward link frame, and need not be included in the control channel 406 in those instances. In both cases, a signaling channel 516 and a power control channel 518 may be present in the control channel 406, as depicted in FIG. 5A. The signaling channel 516 may include assignment, acknowledgement, and/or power references and adjustments for data, control, and pilot transmissions on the reverse link.

Power control channel 518 may carry information regarding interference generated at other sectors due to transmissions from access terminals of that sector. Also, in certain aspects, the subcarriers 420 at the edge of the entire bandwidth may function as quasi-guard subcarriers.

It should be noted that where multiple transmit antennas may be used to transmit for a sector, the different transmit antennas should have the same superframe timing (including the superframe index), OFDM symbol characteristics, and hop sequences.

It should be noted that, in some aspects, the channels 512, 514, 516, 518 of control channel 406 may comprise the same allocations as a data transmission, e.g. if data transmissions are block hopped then blocks of the same or different sizes may be allocated for the control channel 406.

Referring to FIG. 5B, aspects of a reverse link frame for a multiple access wireless communication system are illustrated. A pilot channel 522 may include pilots to allow the access point to estimate the reverse link. A request channel 524 may include information to allow an access terminal to request resources for following reverse link, and forward link, frames.

A reverse link feedback channel 526 allows access terminals to provide feedback with respect to channel information CQI. The CQI may relate to one or more scheduled modes, or available modes for scheduling, for transmission to the access terminal. Exemplary modes may include beamforming, SDMA, precoding, or combinations thereof. A power control channel 528 may be used as a reference to allow the access point to generate power control instructions for reverse link transmission, e.g. data transmissions, by the access terminal. In some aspects, the power control channel 528 may comprise one or more of the feedback channels 526. Data channels 432 may operate according to a symbol rate hopping or block hopping mode in different reverse link frames 408. Also, in certain aspects, the subcarriers 480 at the edge of the entire bandwidth may function as quasi-guard subcarriers.

It should be noted that while FIGS. 5A and 5B depict different channels that make up control channels 406 and 440 as being multiplexed in time, this need not be the case. The different channels that make up control channels 406 and 440 may be multiplexed using different orthogonal, quasi-orthogonal, or scrambling codes, different frequencies, or any combinations of time, code, and frequency.

Figure 6:
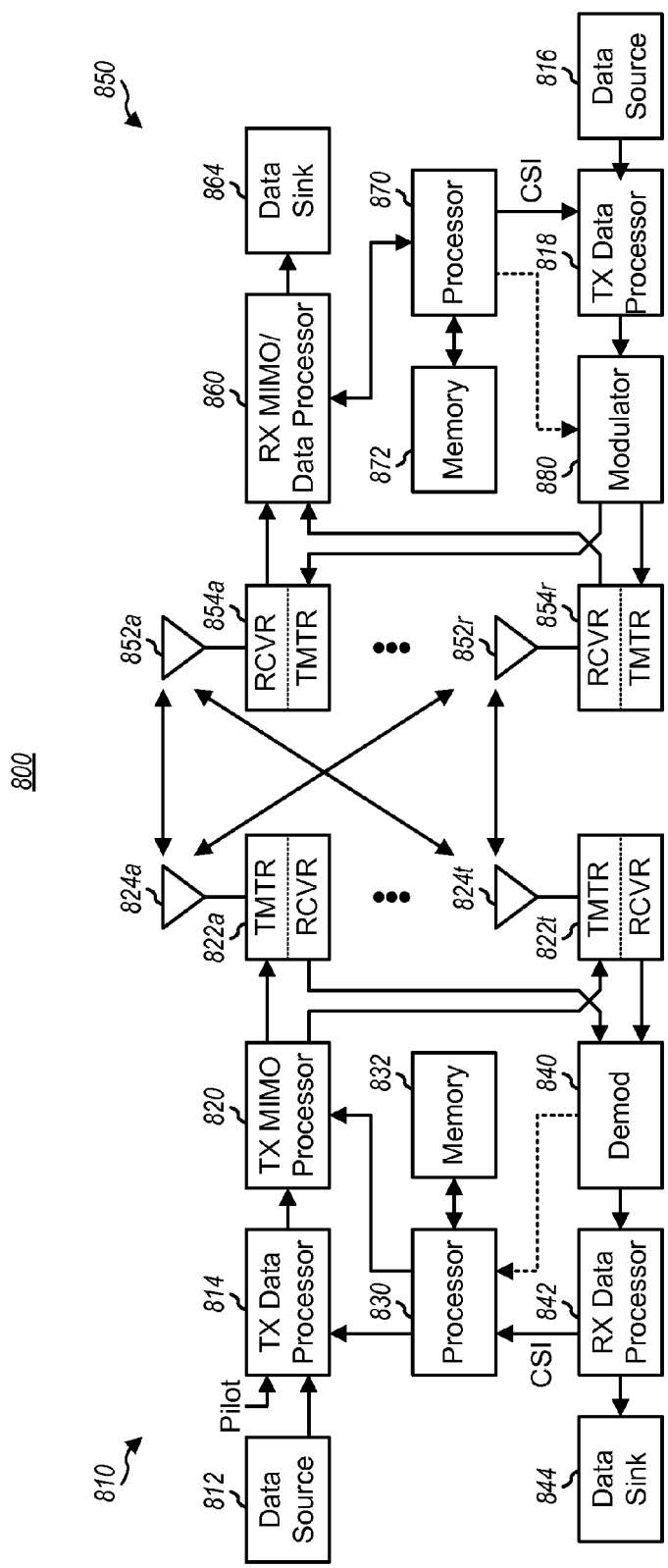
FIG. 6 illustrates aspects of first and second communication devices in a multiple access wireless communication system.

Referring to FIG. 6, a block diagram of an embodiment of an exemplary first communications device or system 810 and an exemplary second communications device or system 850 in a MIMO system 800 is illustrated. At first communications device 810, traffic data for a number of data streams is provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 830.

The modulation symbols for each of the data streams are then provided to a TX processor 820, which may further process the modulation symbols (e.g., for OFDM). TX processor 820 then provides $N_T$ modulation symbol streams to $N_T$ transmitters (TMTR 822a through 822t). Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At second communications device 850, the transmitted modulated signals are received by $N_R$ antennas 852a through 852r and the received signal from each antenna 852 is provided to a respective receiver (RCVR) 854. Each receiver 854 (854a through 854r) conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The processing by RX data processor 860 is described in further detail below. Each detected symbol stream includes symbols that are estimates of the modulation symbols transmitted for the corresponding data stream. RX data processor 860 then demodulates, deinterleaves, and decodes each detected symbol stream to recover the traffic data for the data stream. Recovered data is stored in data sink 864. The processing by RX data processor 860 is complementary to that performed by TX processor 820 and TX data processor 814 at first communications device 810.

RX data processor 860 may be limited in the number of subcarriers that it may simultaneously demodulate, e.g. 512 subcarriers or 5 MHz, 128 subcarriers or 1.25 MHz. 256 subcarriers or 2.5 MHz.

The channel response estimate generated by RX processor 860 may be used to perform space, space/time processing at the receiver, adjust power levels, change modulation rates or schemes, or other actions. RX processor 860 may further estimate the signal-to-noise-and-interference ratios (SNRs) of the detected symbol streams, and possibly other channel characteristics, and provides these quantities to a processor 870. RX data processor 860 or processor 870 may further derive an estimate of the "operating" SNR for the system. Processor 870 then provides channel state information (CSI), which may comprise various types of information regarding the communication link and/or the received data stream. For example, the CSI may comprise the operating SNR. The CSI is then processed by a TX data processor 818, modulated by a modulator 880, conditioned by transmitters 854a through 854r, and transmitted back to first communications device 810. Additional data from data source 816, e.g., including reverse link traffic, may be, and sometimes is, received by TX data processor 818, modulated by modulator 880, conditioned by transmitters 854a through 854r, and transmitted to first communications device 810.

At first communications device 810, the modulated signals from second communications device 850 are received by antennas 824, conditioned by receivers 822, demodulated by a demodulator 840, and processed by a RX data processor 842 to recover the CSI reported by the receiver system. The reported CSI is then provided to processor 830 and used to (1) determine the data rates and coding and modulation schemes to be used for the data streams and (2) generate various controls for TX data processor 814 and TX processor 820. Alternatively, the CSI may be utilized by processor 870 to determine modulation schemes and/or coding rates for transmission, along with other information. This may then be provided to the transmitter of the first communications device which uses this information, which may be quantized, to provide later transmissions to the receiver of the second communications device. Data recovered by RX data processor 842 may be, and sometimes is, stored in data sink 844. Recovered data may, and sometimes does, included reverse link traffic data.

Processors 830 and 870 direct the operation at the first and second communications devices, respectively. Memories 832 and 872 provide storage for program codes and data used by processors 830 and 870, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 6 describes a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 6.

The transmission techniques described herein may be implemented by various means. For example, these techniques may be implemented in hardware, firmware, software, or a combination thereof. For a hardware implementation, the processing units at a first communications device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a second communications device may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 832 or 872 in FIG. 6) and executed by a processor (e.g., processor 830 or 870). The memory may be implemented within the processor or external to the processor.

It should be noted that the concept of channels herein refers to information or transmission types that may be transmitted by the access point or access terminal. It does not require or utilize fixed or predetermined blocks of sub-carriers, time periods, or other resources dedicated to such transmissions.

Figure 7:
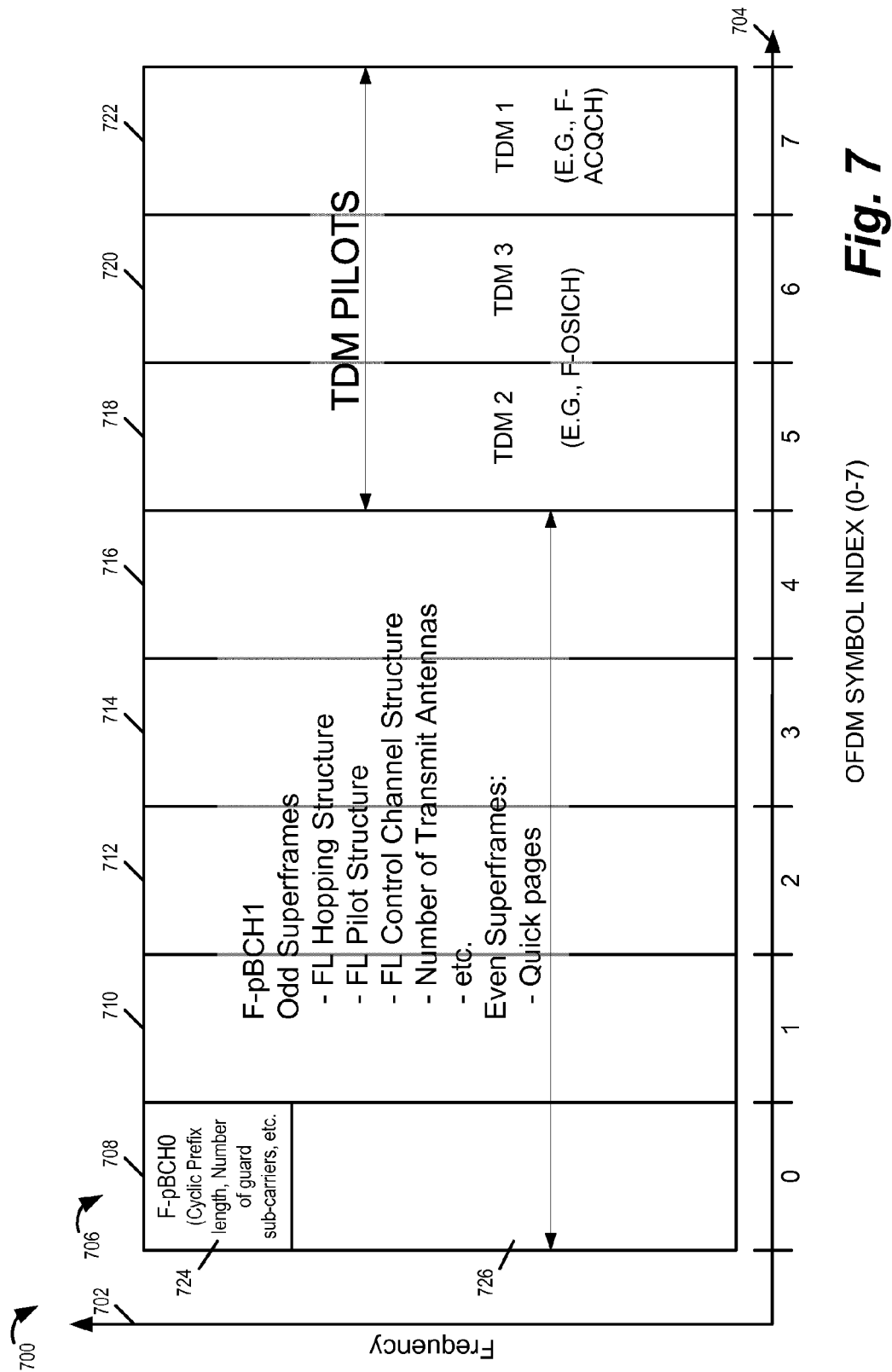
FIG. 7 is a drawing which illustrates aspects of an exemplary superframe preamble for an exemplary wireless communication system.

In some exemplary embodiments, each FL superframe includes a superframe preamble followed by a sequence of FL frames (see FIGS. 2A and 2B). FIG. 7 is a drawing 700 of frequency on the vertical axis 702 vs OFDM symbol index on the horizontal axis 704 which includes exemplary superframe preamble 706. Exemplary superframe preamble 706 comprises 8 OFDM symbols (708, 710, 712, 714, 716, 718, 720, 722) for FFT sizes of 512 and above. These symbols are indexed 0 through 7 as shown in FIG. 7.

An exemplary superframe preamble, in some embodiments, comprises 16 OFDM symbols for the case of a 256 point FFT. Another exemplary superframe preamble comprises 32 OFDM symbols for the case of 128 point FFT. For simplicity, the following description is directed to FFT sizes of 512 and above. For the other cases, each constituent channel of the superframe preamble is scaled (repeated in time) by the appropriate factor (factor of 2 in the case of a 256 point FFT and factor of 4 in the case of 128 point FFT) as compared to the case of a 512 point FFT.

The last three OFDM symbols (718, 720, 722) in the superframe preamble 706 (the symbols indexed 5, 6 and 7) are TDM pilots which are used for initial acquisition. These symbols may also be referred to as TDM pilot 1, TDM pilot 2 and TDM pilot 3. The first of these forms the Acquisition Channel (F-ACQCH), while the latter two are reused in order to transmit the Other Sector Interference Channel (F-OSICH). TDM Pilot 1 is transmitted on OFDM symbol 7 722), while TDM Pilots 2 and 3 are transmitted on OFDM symbols 5 and 6 (718, 720) respectively.

An exemplary TDM Pilot 1 will now be described. TDM Pilot 1 is an OFDM symbol comprising a time-domain PN sequence with four periods. The construction of TDM Pilot 1 depends on whether the bandwidth is less than 5 MHz or greater than 5 MHz.

In a deployment with bandwidth 5 MHz or less, this OFDM symbol is constructed by taking the FFT of a PN sequence of length $N_{FFT}/4$ and populating every fourth subcarrier (excluding guard subcarriers) with the FFT values. This is followed by an IFFT and the addition of cyclic prefix and windowing intervals, like in each of the other OFDM symbols. The PN sequence used for this purpose does not depend on the sector, therefore it is not possible to identify sectors using TDM Pilot 1. However, the PN sequence does depend on the bandwidth. A different PN sequence is used for each of the following three cases: BW≤1.25 MHz, 1.25 MHz<BW≤2.5 MHz and 2.5 MHz<BW≤5 MHz.

In a bandwidth of more than 5 MHz, the bandwidth is split into segments which have a bandwidth of 5 MHz each. A sector transmits a TDM Pilot 1 on one segment in any given superframe. However, the segment on which the sector transmits the pilot varies from superframe to superframe. The segment is chosen differently in the two different synchronization modes. The time domain sequence used for modulation is again independent of the sector and depends on the total bandwidth and the index of the segment.

TDM Pilot 1 can be used to get an estimate of the superframe timing. For example, the AT can correlate the received waveform against the known TDM PN sequence and compare the correlated value to a threshold to determine if TDM Pilot 1 is present at any given period of time. Once a timing is identified, the AT can proceed to sector identification using TDM Pilots 2 and 3. TDM Pilot 1 may also be used for frequency correction.

Exemplary TDM Pilots 2 and 3 will now be described. TDM Pilots 2 and 3 are used for sector identification after one or more strong paths have been acquired using TDM Pilot 1. TDM Pilots 2 and 3 are constructed using a time-domain sequence that is one of a set of 1024 Walsh sequences scrambled by a PN sequence. The first 512 elements of the Walsh sequence are used to construct TDM Pilot 2 and the latter 512 to construct TDM Pilot 3. The Walsh sequence depends on the sector's PilotPN and does not change from superframe to superframe. Out of the 1024 sequences, 512 sequences are reserved for Semi Synchronous mode and the other 512 are reserved for Asynchronous mode. The PN sequence depends on the system bandwidth in the case of a deployment with bandwidth≤5 MHz and on the system bandwidth and segment index in case of a deployment with bandwidth>5 MHz. The segments on which TDM Pilots 2 and 3 are transmitted is identical to the segment on which TDM Pilot 1 is transmitted.

Synchronization Modes will now be described. The system supports two modes, namely Semi-synchronous and Asynchronous, and the TDM pilots are generated differently in the two cases.

Semi Synchronous Mode will now be described. For some applications, such as ranging, it is useful to detect extremely weak sectors. For this reason it can be important to allow correlations over more than one superframe preamble. In order to get processing gains over more than one superframe preamble, it is advantageous that the interfering signal (i.e., the TDM pilot of the neighboring sector) change from one superframe preamble to the next. To enable this, an auxiliary quantity that changes from superframe to superframe called the PilotPhase is defined for each sector. The PilotPhase is a 9 bit quantity defined as PilotPhase=(PilotPN+SuperframeIndex)mod 512, where SuperframeIndex is a counter that is incremented from one superframe to the next, and is defined globally across each of the sectors. The PilotPhase is used to generate the scrambling sequences for the two TDM pilots. Furthermore, the segment on which the TDM Pilots are transmitted in a deployment with BW>5 MHz is chosen pseudo-randomly as a function of PilotPhase.

This pilot structure has some level of synchronization between two sectors, as different sectors use offsets of the same sequence. To be more precise, if all possible values of PilotPN are possible, then this structure requires that any two sectors be synchronized to within half a superframe—but not at the symbol or chip level. Otherwise it is conceivable that two sectors with different PilotPNs may transmit the same acquisition pilots (same PN sequences) at the same time. This mode can be, and sometimes is, used to improve performance (reduce acquisition time, fast sector switching, interference estimation, etc).

Asynchronous Mode will now be described. In some situations it is not possible to accurately synchronize two sectors. In order to support these scenarios, there is a mode in the system that has no synchronization requirements. In this mode, the TDM pilots are scrambled directly using the PilotPN instead of the auxiliary quantity PilotPhase. For a system with bandwidth≤5 MHz, the TDM pilots are the same from superframe to superframe. For a system with bandwidth>5 MHz, the TDM Pilots cycle deterministically through the set of available segments.

An exemplary acquisition procedure will now be described. The first five OFDM symbols (708, 710, 712, 714, 716) in the superframe preamble are used to carry the two Primary Broadcast Channels, namely F-pBCH0 and F-pBCH1. First OFDM symbol 708 includes a F-pBCH0 portion 724 and a F-pBCH1portion 726. Second through fifth OFDM symbols (710, 710, 712, 714, 716) carry F-pBCH1 information. These channels carry configuration information that the AT needs to have before it can demodulate the PHY Frames. In addition, the F-pBCH1 channel also carries paging information.

An F-pBCH0 packet, in this exemplary embodiment, is encoded over 16 superframes, and occupies ¼ of an OFDM symbol in each superframe preamble—an extremely small overhead. F-pBCH0 carries deployment-wide static parameters like cyclic prefix duration, number of guard subcarriers, in addition to the superframe index, and is required only at initial wake-up.

An F-pBCH1 packet is encoded over a single superframe and occupies 4 ¾ OFDM symbols in each superframe preamble. The bandwidth overhead of this channel is approximately 2%. F-pBCH1 carries sufficient information to enable the AT to demodulate FL data from the PHY Frames like information on FL hopping patterns, pilot structure, control channel structure, transmit antennae, etc. This information is transmitted every alternate superframe; the other superframes are used to carry pages, e.g., Quick pages. The remaining overhead information is broadcast using a regular data channel in predefined superframes—this carries information on RL hopping patterns, channel mapping, transmit powers, power control parameters, access parameters, etc.

These channels enable a flexible physical layer, allowing a flexible configuration of cyclic prefix, number of antennae, pilot structure, etc. They can also support FL and RL control channels with flexible overheads, which can be matched to the current user loads. Also, features like sub-band scheduling, FFR etc. can be enabled or disabled.

On initial wake-up, the AT first detects a sector and achieves time and frequency synchronization using the TDM pilots. In SemiSynchronous mode, the AT knows the value of the PilotPhase variable at the end of this stage, while in Asynchronous mode, the AT knows the value of the PilotPN variable at the end of this stage. The AT then goes on to demodulate the F-pBCH0 and F-pBCH1 channels. The F-pBCH0 channel carries the lower 9 bits of the SuperframeIndex, which enables the AT to find the value of PilotPN in the SemiSynchronous case (PilotPN=PilotPhase−SuperframeIndex mod 512). Therefore, in both SemiSynchronous as well as Asynchronous modes, at the end of this stage, the AT knows the PilotPN and SuperframeIndex variables, which are together used to seed various random number generators (for hopping, scrambling, etc) used in generating the FL waveform.

The Other Sector Interference Channel (F-OSICH), in one embodiment, carries a three state quantity that is modulated as a phase on TDM pilots 2 and 3. Since the TDM pilot waveform is known once acquisition is completed, the superposition causes no degradation to the performance of the OSICH. One of the characteristics is that it is used by ATs in the neighboring sector, i.e., it should be decodable at extremely low SNRs. This is accomplished by providing an extremely large spreading gain for this channel, i.e., an entire OFDM symbol is used to transmit less than two bits of information or two OFDM symbols are used to transmit less than two bits of information.

Figure 8:
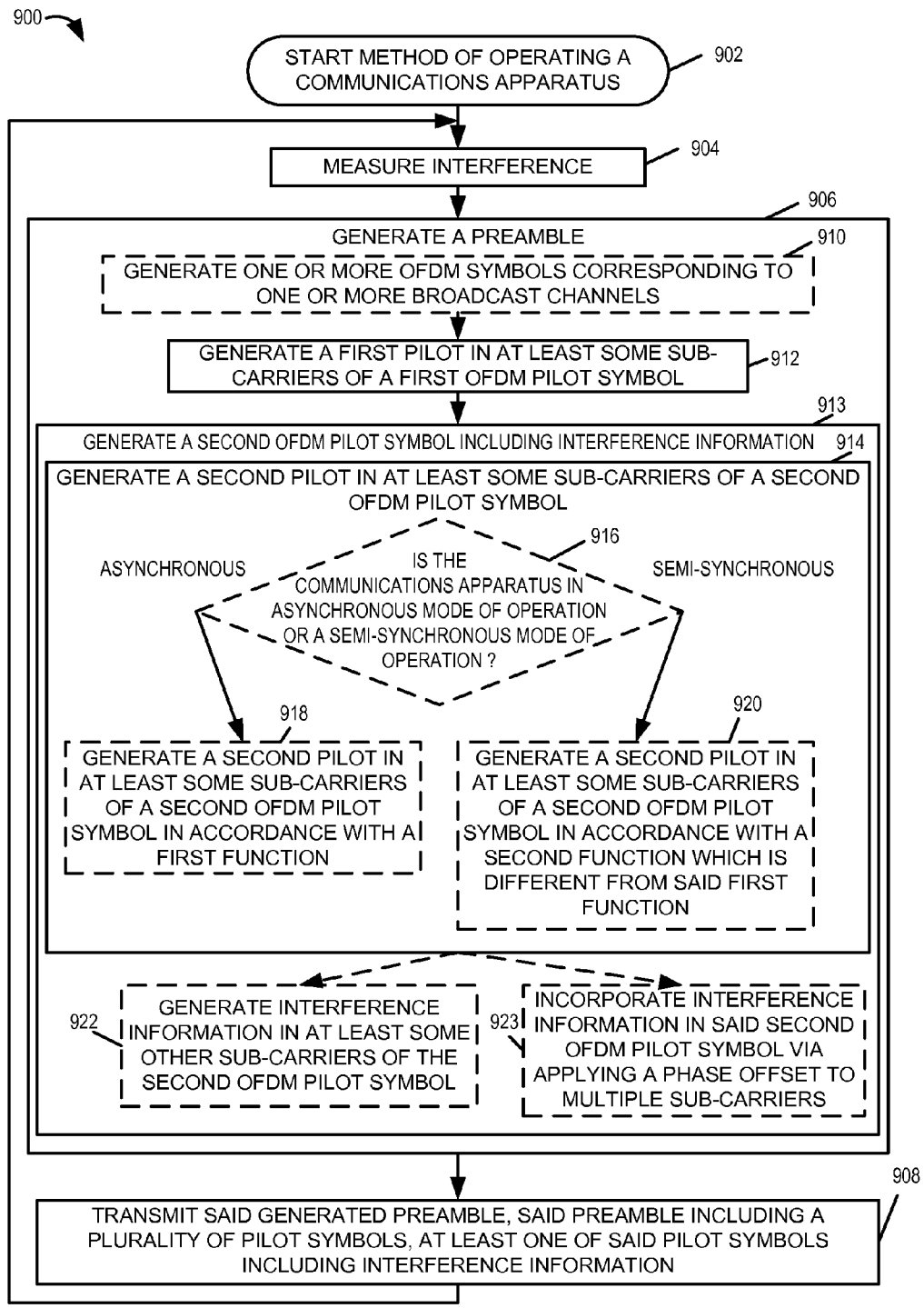
FIG. 8 is a flowchart of an exemplary method of operating a communications apparatus, e.g., an access point or a base station, in accordance with various embodiments.

FIG. 8 is a flowchart 900 of an exemplary method of operating a communications apparatus, e.g., an access point or a base station, in accordance with various embodiments. Operation starts in step 902, where the communications apparatus is powered on and initialized and proceeds to step 904.

In step 904, the communications apparatus measures interference. Operation proceeds from step 904 to step 906.

In step 906, the communications apparatus generates a preamble, e.g., a superframe preamble. Step 906 includes sub-steps 912 and 913. In some embodiments step 906 includes sub-step 910, in which the communications apparatus generates one or more OFDM symbols corresponding to one or more broadcast channels. Operation proceeds from sub-step 910 to sub-step 912. In other embodiments sub-step 910 is not included as part of step 906.

In sub-step 912, the communications apparatus generates a first pilot in at least some sub-carriers of a first OFDM pilot symbol. Operation proceeds from sub-step 912 to sub-step 913. In sub-step 913, the communications apparatus generates a second OFDM pilot symbol including interference information. Sub-step 913 includes sub-step 914 and one or more of sub-steps 922 and 923. In sub-step 914, the communications apparatus generates a second pilot in at least some sub-carriers of a second OFDM pilot symbol. In some embodiments, generating a second pilot includes using a scrambling sequence that is applied to a first pilot. In some embodiments, generating a second pilot includes multiplying a scrambling sequence used to generate the second pilot by an offset. In some embodiments, the offset depends on interference information. In some embodiments, the offset has unit modulus, e.g., the offset is of the form exp(j*theta).

In some embodiments sub-step 914 includes sub-steps 916, 918 and 920. In sub-step 916, the communications apparatus determines whether the communications apparatus is in an asynchronous mode of operation or a semi-synchronous mode of operation. If the communications apparatus is in an asynchronous mode of operation, then operation proceeds from sub-step 916 to sub-step 918 in which the communications apparatus generates a second pilot in at least some sub-carriers of a second OFDM pilot symbol in accordance with a first function. However, if the communications apparatus is in a semi-synchronous mode of operation, then operation proceeds from sub-step 916 to sub-step 920 in which the communications apparatus generates a second pilot in at least some sub-carriers of a second OFDM pilot symbol in accordance with a second function which is different from said first function.

Operation proceeds from sub-step 914 to sub-step 922 or to alternative sub-step 923. In sub-step 922 the communications apparatus generates interference information in at least some other sub-carriers of the second OFDM pilot symbol. In some embodiments, at least two symbols are used in the preamble to communicate interference information. In sub-step 923 the communications apparatus incorporates interference information in said second OFDM pilot symbol via applying a phase offset to multiple sub-carriers. For example, different phase offset multiplier values, in some embodiments, are associated with different interference levels to be communicated. In some embodiments, the phase offset is applied by performing a phase multiplication operation on an input symbol which does not include interference information to generate a pilot symbol including interference information. Operation proceeds from step 906 to step 908.

In step 908, the communications apparatus transmits the generated preamble, said preamble including a plurality of pilot symbols, at least one of said pilot symbols including interference information. In various embodiments, transmitting a preamble further includes transmitting as part of said preamble at least one symbol corresponding to a broadcast channel used to communicate system configuration information. In some embodiments, transmitting a preamble includes transmitting the generated first OFDM pilot symbol and the generated second OFDM pilot symbol as adjacent OFDM symbols in said preamble. In some embodiments one of said first and second OFDM pilot symbols is the last OFDM symbol in the preamble. Operation proceeds from step 908 to step 904, where the communications apparatus measures interference information.

In some embodiments, the pilot symbols in the preamble include acquisition pilots used for at least one of timing acquisition and sector identification. In various embodiments, the preamble includes more symbols used to communicate system configuration information than to communicate interference information.

In some embodiments, the symbols in the superframe preamble include the same number of tones per symbol as symbols used to communicate data as part of a frame within a body of said superframe. In some embodiments, the symbols in the superframe preamble include fewer tones per symbol than symbols used to communicate data as part of a frame within a body of said superframe.

Figure 9:
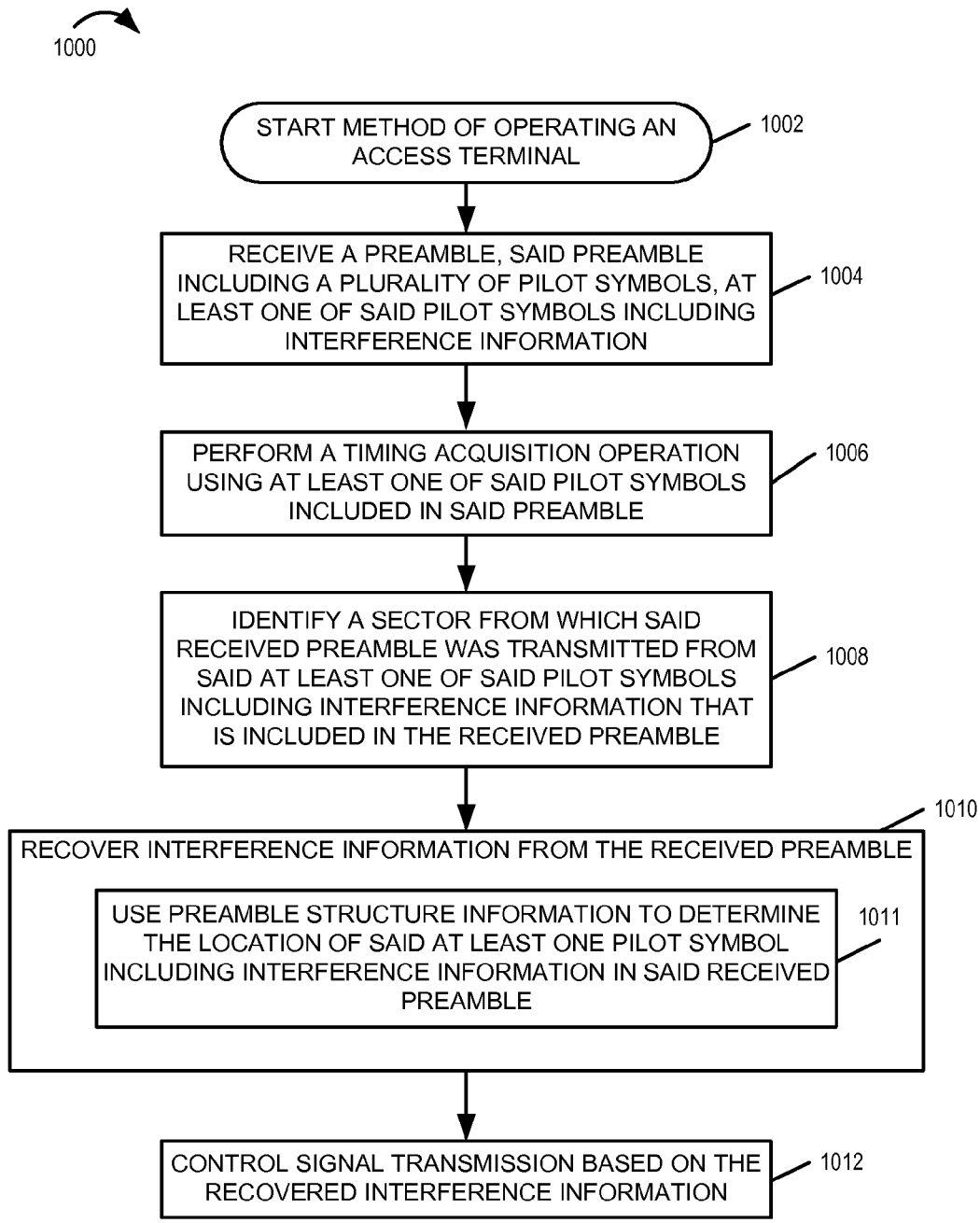
FIG. 9 is a flowchart of an exemplary method of operating an access terminal in accordance with various embodiments.

FIG. 9 is a flowchart 1000 of an exemplary method of operating an access terminal in accordance with various embodiments. Operation starts in step 1002 where the access terminal is powered on and initialized and proceeds to step 1004. In step 1004, the access terminal receives a preamble, said preamble including a plurality of pilot symbols, at least one of said pilot symbols including interference information. The received preamble is, e.g., a superframe preamble. In some such embodiments, the symbols in the superframe preamble include the same number of tones per symbol as the symbols used to communicate data as part of a frame within a body of said superframe. In some other embodiments, the symbols in the superframe preamble include fewer tones per symbol than the symbols used to communicate data as part of a frame within a body of said superframe. In some embodiments, the received preamble includes more symbols used to communicate system configuration information than used to communicate interference information. Operation proceeds from step 1004 to step 1006.

In step 1006, the access terminal performs a timing acquisition operation using at least one of said pilot symbols included in said preamble. Operation proceeds from step 1006 to step 1008. In step 1008, the access terminal identifies a sector from which the received preamble was transmitted from said at least one of said pilot symbols including interference information that is included in the received preamble. Operation proceeds from step 1008 to step 1010.

In step 1010, the access terminal recovers interference information from the received preamble. In some embodiments, at least two symbols are used in the receive preamble to communicate interference information and recovering interference information from the received preamble includes recovering interference information from at least two symbols. In various embodiments, recovering interference information includes performing an unscrambling operation using a scrambling sequence that is applied to a first pilot to generate a second pilot. Step 1010 includes sub-step 1011, in which the access terminal uses preamble structure information to determine the location of said at least one pilot symbol including interference information in said received preamble.

In some embodiments interference information, e.g., other sector interference information, is communicated via modulation symbols values of one or more sub-carriers of a pilot symbol and determining interference information includes demodulating and decoding those modulation symbols to obtain the interference information being conveyed. In some embodiments interference information, e.g., other sector interference information, is communicated via a phase multiplier, e.g., a phase multiplier applied in generating a pilot symbol. In some such embodiments, recovering interference information from the received preamble includes determining the phase multiplier value communicated and determining the interference information being communicated, e.g., interference level being communicated, which corresponds, e.g., maps, to the communicated phase multiplier value.

Operation proceeds from step 1010 to step 1012 in which the access terminal controls signal transmission based on the recovered interference information. Examples of controlling signal transmission based on the recovered interference information include: refraining to transmit, controlling and/or changing the rate of transmission, controlling and/or changing the power level of transmission, controlling and/or changing the data rate of transmission, controlling and/or changing the coding rate of transmission, controlling and/or changing the error correcting code used for transmission signals, controlling and/or changing the mode of operation, and/or controlling and/or changing the amount of overhead control signaling used.

Figure 10:
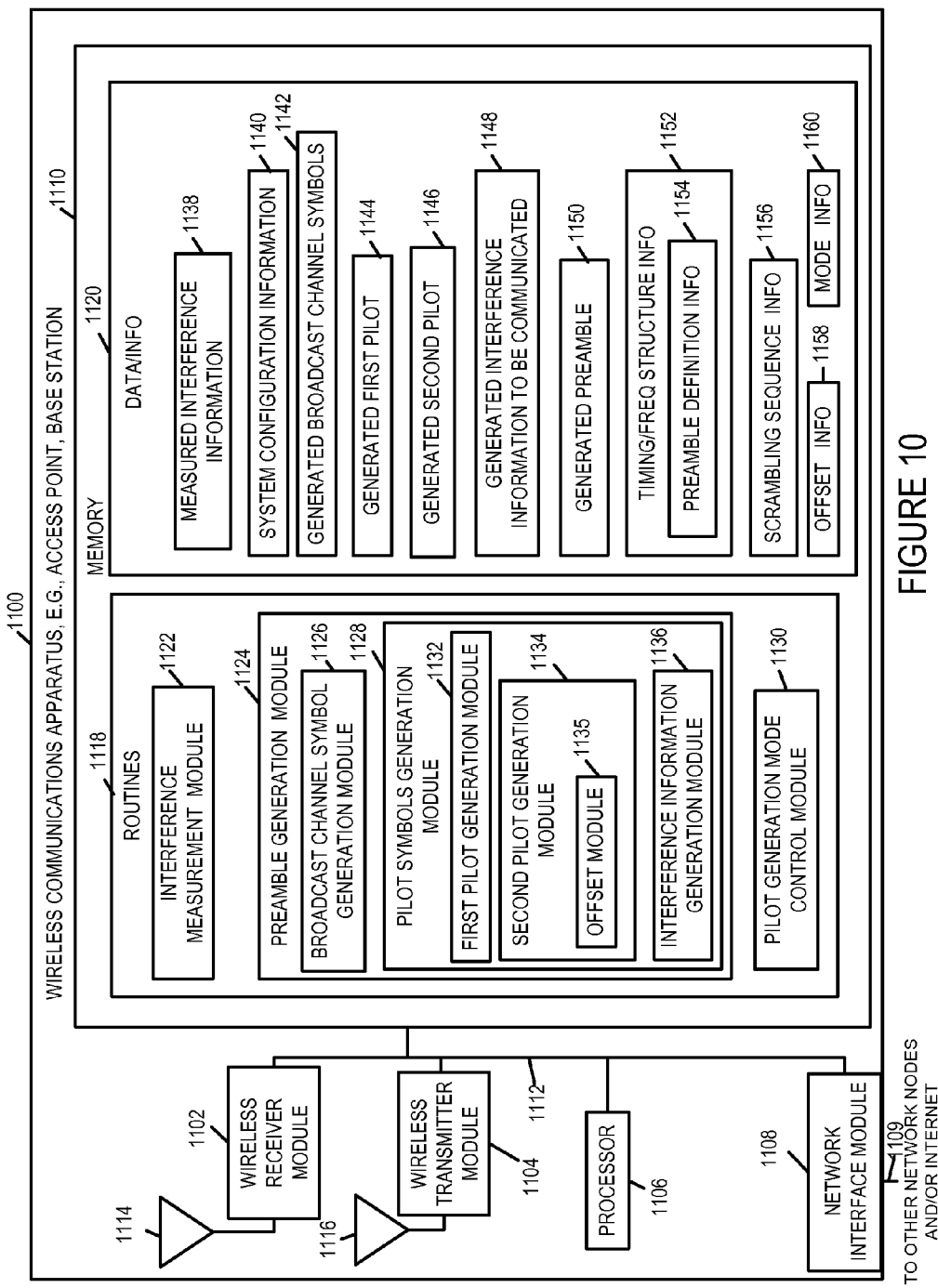
FIG. 10 is a drawing of an exemplary wireless communications apparatus, e.g., access point or base station, in accordance with various embodiments.

FIG. 10 is a drawing of an exemplary wireless communications apparatus 1100, e.g., access point or base station, in accordance with various embodiments. Exemplary wireless communications apparatus 1100 includes a wireless receiver module 1102, a wireless transmitter module 1104, a processor 1106, a network interface module 1108 and memory 1110 coupled together via a bus 1112 over which the various elements may interchange data and information. Memory 1110 includes routines 1118 and data/information 1120. The processor 1106, e.g., a CPU, executes the routines 1118 and uses the data/information 1120 in memory 1110 to control the operation of the wireless communications apparatus 1100 and implement methods, e.g., the methods of flowchart 900 of FIG. 8.

Wireless receiver module 1102, e.g., an OFDM receiver, is coupled to receive antenna 1114 via which the wireless communications apparatus receives signals including signals from which interference is measured. Wireless transmitter module 1104, e.g., an OFDM transmitter, is coupled to transmit antenna 1116, via which the wireless communications apparatus transmits signals. Wireless transmitter module 1104 transmits generated preambles. Wireless transmitter module 1104 also transmits forward link frames, e.g., downlink frames including traffic data and/or control data. In some embodiments, the wireless transmitter module 1104 transmits a first OFDM pilot symbol and a second OFDM pilot symbol as adjacent OFDM symbols in a preamble, e.g., a superframe preamble. In some embodiments, a pilot symbol is the last symbol transmitted in the preamble.

In some embodiments, the same antenna is used for transmission and reception. In some embodiments multiple antennas and/or multiple antenna elements are used for reception. In some embodiments multiple antennas and/or multiple antenna elements are used for transmission. In some embodiments at least some of the same antennas or antenna elements are used for both transmission and reception. In some embodiments, the wireless communications apparatus 1100 uses MIMO techniques.

Network interface module 1108 is coupled to other network nodes, e.g., other access points/base stations, AAA node, home agent node, etc, and/or the Internet via network link 1109.

Routines 1118 include an interference measurement module 1122, a preamble generation module 1124 and a pilot generation mode control module 1130. Preamble generation module 1124 includes a broadcast channel symbol generation module 1126 and a pilot symbols generation module 1128. Pilot symbols generation module 1128 includes a first pilot generation module 1132, a second pilot generation module 1134, and an interference information generation module 1136.

Data/information 1120 includes measured interference information 1138, system configuration information 1140, generated broadcast channel symbols 1142, generated first pilot 1144, generated second pilot 1146, generated interference information to be communicated 1148, a generated preamble 1150, timing/frequency structure information 1152, scrambling sequence information 1156, offset information 1158 and mode information 1160. Timing/frequency structure information 1152 includes preamble definition information 1154. Timing/frequency structure information 1152 includes information identifying forward link structure and reverse link structure, e.g., forward link superframes including preambles and frames. FIG. 3 and FIG. 7 illustrate exemplary preamble structures. Information defining such structures may be included in information 1154. Mode information 1160 includes information identifying alternative modes that wireless communications devices can operate in, e.g., an asynchronous mode and a semi-synchronous mode of operation, and information identifying the current mode of operation. The wireless communications device 1100, e.g., base station, in some embodiments, changes its pilot signal generation for the preamble generation as a function of the mode, e.g., to accommodate conditions when adjacent base stations are transmitting asynchronously and when adjacent base stations are transmitting semi-synchronously.

Interference measurement module 1122 measures interference. In some embodiments, the interference measurement module 1122 is an other sector interference measurement module which measures interference with respect to sectors other than the sector from which the generated preamble is transmitted. Measured interference information 1138 is an output of interference measurement module 1122.

Preamble generation module 1124 generates a preamble, e.g., generated preamble 1150, said preamble including a plurality of pilot symbols, at least one of said pilot symbols including interference information.

Broadcast channel symbol generation module 1126 generates at least one symbol corresponding to a broadcast channel used to communicate system configuration information. In some embodiments, multiple broadcast channels are supported. In some such embodiments, at least one symbol includes a first broadcast channel and a portion of a second broadcast channel.

In various embodiments, the preamble generation module 1124 generates pilots which are acquisition pilots used for at least one of timing acquisition and sector identification. In some embodiments, the preamble generation module 1124 includes more symbols used to communicate system configuration information than used to communicate interference information in the generated preamble. In some embodiments, the generated preamble is a superframe preamble, and at least two symbols are used in the preamble to communicate interference information.

Pilot symbols generation module 1128 generates the pilot symbols of the generated preamble 1150. First pilot generation module 1132 generates a first pilot in at least some subcarriers of a first OFDM pilot symbol. Second pilot generation module 1134 generates a second pilot in at least some sub-carriers of a second OFDM pilot symbol. Interference information generation module 1136 generates interference information in at least some other sub-carriers of the second OFDM pilot symbol. The plurality of pilot symbols included in the preamble includes the generated first and second pilots.

In various embodiments, the second pilot generation module 1134 generates the second pilot using a scrambling sequence that is applied to a first pilot generated by the first pilot generation module 1132. In some embodiments, the second pilot generation module 1134 includes an offset module 1135 for applying an offset to a scrambling sequence used to generate the second pilot. In some embodiments, the offset depends on interference information. In various embodiments, the offset has unit modulus, e.g., is of the form exp (j*theta).

Pilot generation mode control module 1130 controls the second pilot generation module 1134 to operate in one of a first and second mode of operation at a given time, said first mode of operation corresponding to a communications apparatus asynchronous mode of operation and said second mode of operation corresponding to a communications apparatus semi-synchronous mode of operation, said second pilot generation module 1134 generating the second pilot differently during said first and second modes of operation.

Figure 11:
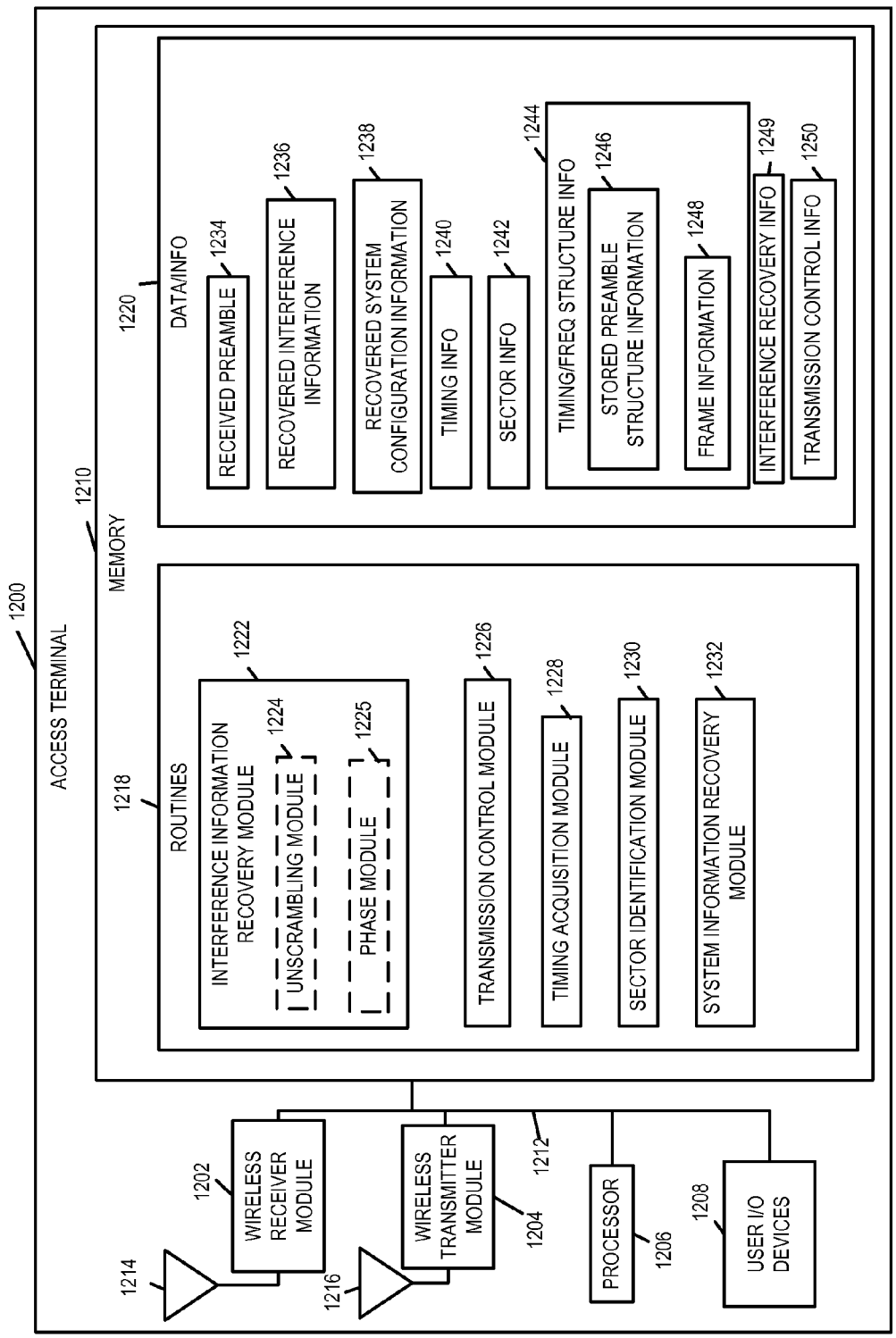
FIG. 11 is a drawing of an exemplary access terminal in accordance with various embodiments.

FIG. 11 is a drawing of an exemplary access terminal 1200 in accordance with various embodiments. Exemplary access terminal 1200 includes a wireless receiver module 1202, a wireless transmitter module 1204, a processor 1206, user I/O devices 1208 and memory 1210 coupled together via a bus 1212 over which the various elements may interchange data and information. Memory 1210 includes routines 1218 and data/information 1220. The processor 1206, e.g., a CPU, executes the routines 1218 and uses the data/information 1220 in memory 1210 to control the operation of the access terminal 1200 and implement methods, e.g., the methods of flowchart 1000 of FIG. 9.

Wireless receiver module 1202, e.g., an OFDM receiver, is coupled to receive antenna 1214 via which the access terminal 1200 receives downlink signals from communications devices, e.g., access points. Wireless receiver module 1202 receives a preamble, e.g., received preamble 1234, said preamble including a plurality of pilot symbols, at least one of said pilot symbols including interference information. Wireless receiver module 1202 also receives information communicated in forward link frames, e.g., downlink traffic data and control data. Wireless transmitter module 1204, e.g., an OFDM transmitter, is coupled to transmit antenna 1216 via which the access terminal 1200 transmits uplink signals to communications devices, e.g., to access points.

In some embodiments, the same antenna is used for transmission and reception. In some embodiments multiple antennas and/or multiple antenna elements are used for reception. In some embodiments multiple antennas and/or multiple antenna elements are used for transmission. In some embodiments at least some of the same antennas or antenna elements are used for both transmission and reception. In some embodiments, the access terminal 1200 uses MIMO techniques.

User I/O devices 1208 include, e.g., microphone, keyboard, keypad, switches, camera, speaker, display, etc. User I/O devices 1208 allow a user of access terminal 1200 to input data/information, access output data/information, and control at least some functions of the access terminal 1200, e.g., initiate a communications session with a peer node, e.g., another access terminal.

Routines 1218 include an interference information recovery module 1222, a transmission control module 1226, a timing adjustment module 1228, a sector identification module 1230 and a system information recovery module 1232.

Data/information 1220 includes a received preamble 1234, recovered interference information 1236, recovered system configuration information 1238, timing information 1240, sector information 1242, timing and frequency structure information 1244, interference recovery information 1249 and transmission control information 1250. The timing/frequency structure information 1244 includes stored preamble structure information 1246 and frame information 1248. The stored preamble structure information 1246 includes information indicating the location of at least one pilot symbol including interference information in said received preamble. FIG. 3 and FIG. 7 are some examples of preamble structures for which information defining such a structure may be included in information 1246.

Interference information recovery module 1222 recovers interference information from the received preamble. Recovered interference information 1236 is an output of recovery module 1222. In some embodiments, at least two symbols are used in a received preamble to communicate interference information, and the interference information recovery module recovers interference information from at least two symbols. In various embodiments, the interference recovery module 1222 uses the stored preamble structure information 1246 to determine the location of at least one pilot symbol including information included in the received preamble.

In some embodiments, the interference information recovery module 1222 includes an unscrambling module 1224 which performs an unscrambling operation using a scrambling sequence that is applied to a first pilot to generate a second pilot. In various embodiments, the interference information recovery module 1222 includes a phase module 1225. Phase module 1225 determines, from a measured phase offset of a received pilot symbol in the received preamble, the interference information which is being communicated, e.g., one of a plurality of predetermined interference levels. In some embodiments, the phase module 1225 also measures the phase of the received pilot symbol, while in other embodiments, a separate phase offset measurement module, e.g., included as part of interference information recovery module 1222 or wireless receiver module 1202 measures the phase offset.

Transmission control module 1226 controls signal transmission based on the recovered interference information. Transmission control information 1250 includes information used in control, e.g., alternative settings, levels, criteria, and determined control settings. Exemplary transmission controls performed by module 1226 include one or more of: refraining to transmit, controlling and/or changing the rate of transmission, controlling and/or changing the power level of transmission, controlling and/or changing the data rate of transmission, controlling and/or changing the coding rate of transmission, controlling and/or changing the error correcting code used for transmission signals, controlling and/or changing the mode of operation, and/or controlling and/or changing the amount of overhead control signaling used.

Timing acquisition module 1228 performs a timing acquisition operation using at least one of the pilot symbols included in the received preamble. Timing information 1240, e.g., a timing offset adjustment, is an output of timing acquisition module 1228, which is used by one or more of wireless receiver module 1202 and wireless transmitter module 1204.

Sector identification module 1230 identifies a sector from which the received preamble was transmitted from at least one of said pilot symbols including interference information that is included in the received preamble. Sector information 1242, e.g., an identified sector of the source of the received preamble 1234 is an output of identification module 1230.

System information recovery module 1232 recovers system configuration information 1238 from at least some of the non-pilot symbols of the received preamble. In some embodiments, the received preamble 1234 includes more symbols used to communicate system configuration information than used to communicate interference information.

In some embodiments, the received preamble is a superframe preamble. In some embodiments, the symbols in the superframe preamble include the same number of tones per symbol as symbols used to communicate data as part of a frame within a body of the superframe. In some other embodiments, the symbols in the superframe preamble include fewer tones per symbol than symbols used to communicate data as part of a frame within a body of the superframe.

Interference recovery information 1249 includes information used by interference recovery module 1222 to obtain recovered interference information 1236. Exemplary interference recovery information 1249 includes: information identifying subcarriers used to carry modulation symbols within a pilot symbol used to convey interference information; decoding and/or demodulation information used to recover interference information, e.g., an interference level being communicated, from one or more modulation symbols of the pilot symbol used to carry the interference information; and/or information mapping phase offsets to interference information, e.g., information mapping a plurality of interference levels to different phase offsets.

Figure 12:
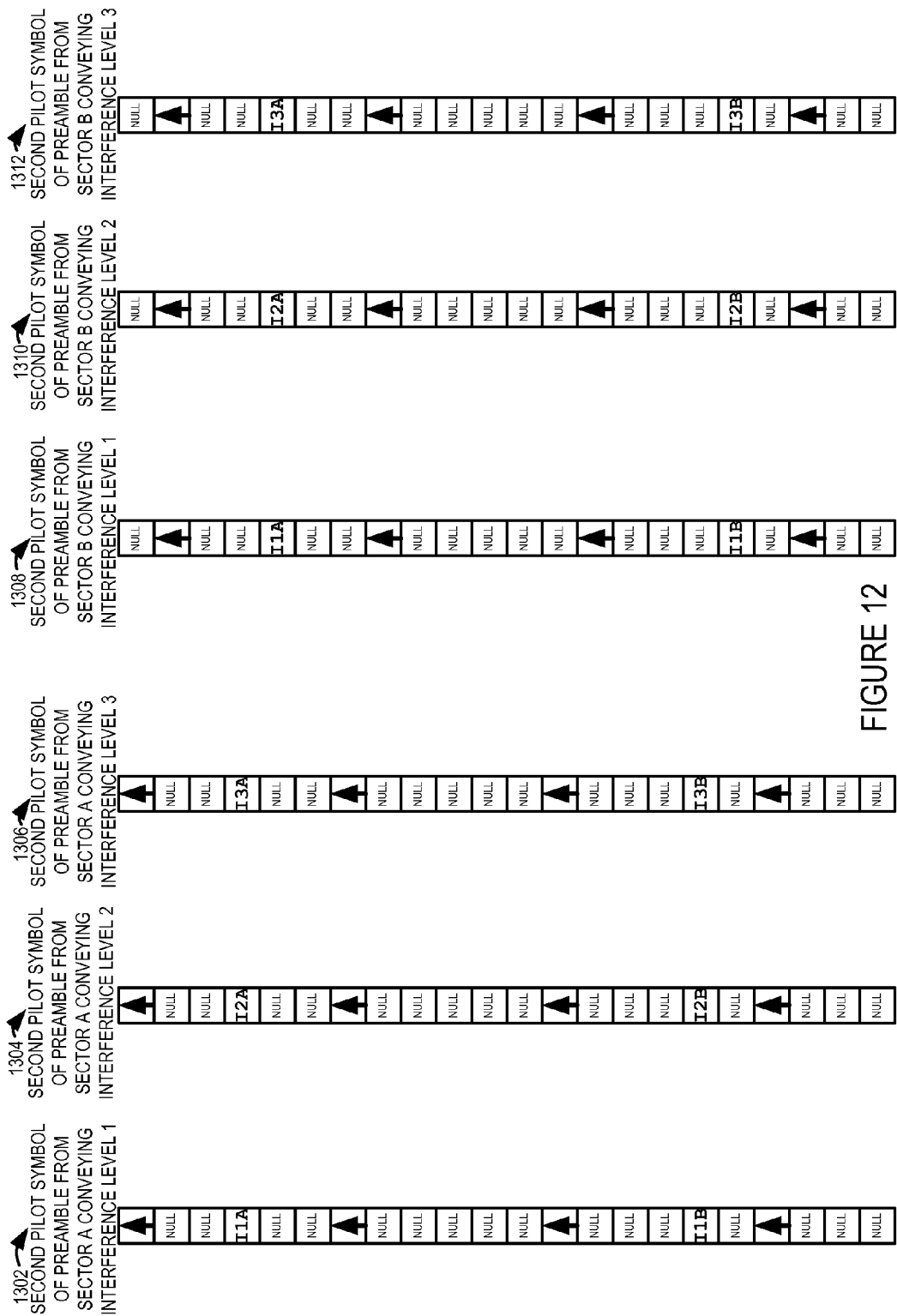
FIG. 12 is a drawing illustrating various exemplary pilot symbols used to convey interference information in accordance with one approach used in some embodiments.

FIG. 12 is a drawing illustrating various exemplary pilot symbols used to convey interference information in some embodiments. In the example of FIG. 12, the pilot symbols used to convey interference information include some sub-carriers conveying a pilot tone as indicated by an arrow, some sub-carriers with intentional nulls as indicated by NULL, and some sub-carriers used for modulation symbols conveying an interference channel. Exemplary pilot symbol 1302 is a second pilot symbol of a preamble from sector A, e.g., a first base station, conveying interference information indicating interference level 1 via modulation symbol values I1A and I1B. Exemplary pilot symbol 1304 is a second pilot symbol of a preamble from sector A, e.g., the first base station, conveying interference information indicating interference level 2 via modulation symbol values I2A and I2B. Exemplary pilot symbol 1306 is a second pilot symbol of a preamble from sector A, e.g., the first base station, conveying interference information indicating interference level 3 via modulation symbol values I3A and I3B.

Exemplary pilot symbol 1308 is a second pilot symbol of a preamble from sector B, e.g., a second base station, conveying interference information indicating interference level 1 via modulation symbol values I1A and I1B. Exemplary pilot symbol 1310 is a second pilot symbol of a preamble from sector B, e.g., the second base station, conveying interference information indicating interference level 2 via modulation symbol values I2A and I2B. Exemplary pilot symbol 1312 is a second pilot symbol of a preamble from sector B, e.g., the second base station, conveying interference information indicating interference level 3 via modulation symbol values I3A and I3B.

In this exemplary embodiment, the location within the pilot symbol of the resources used for the pilot signals change as a function of the sector. In addition, the location within the pilot symbol of the resources used for the modulation symbols conveying interference information changes as a function of the sector.

Figure 13:
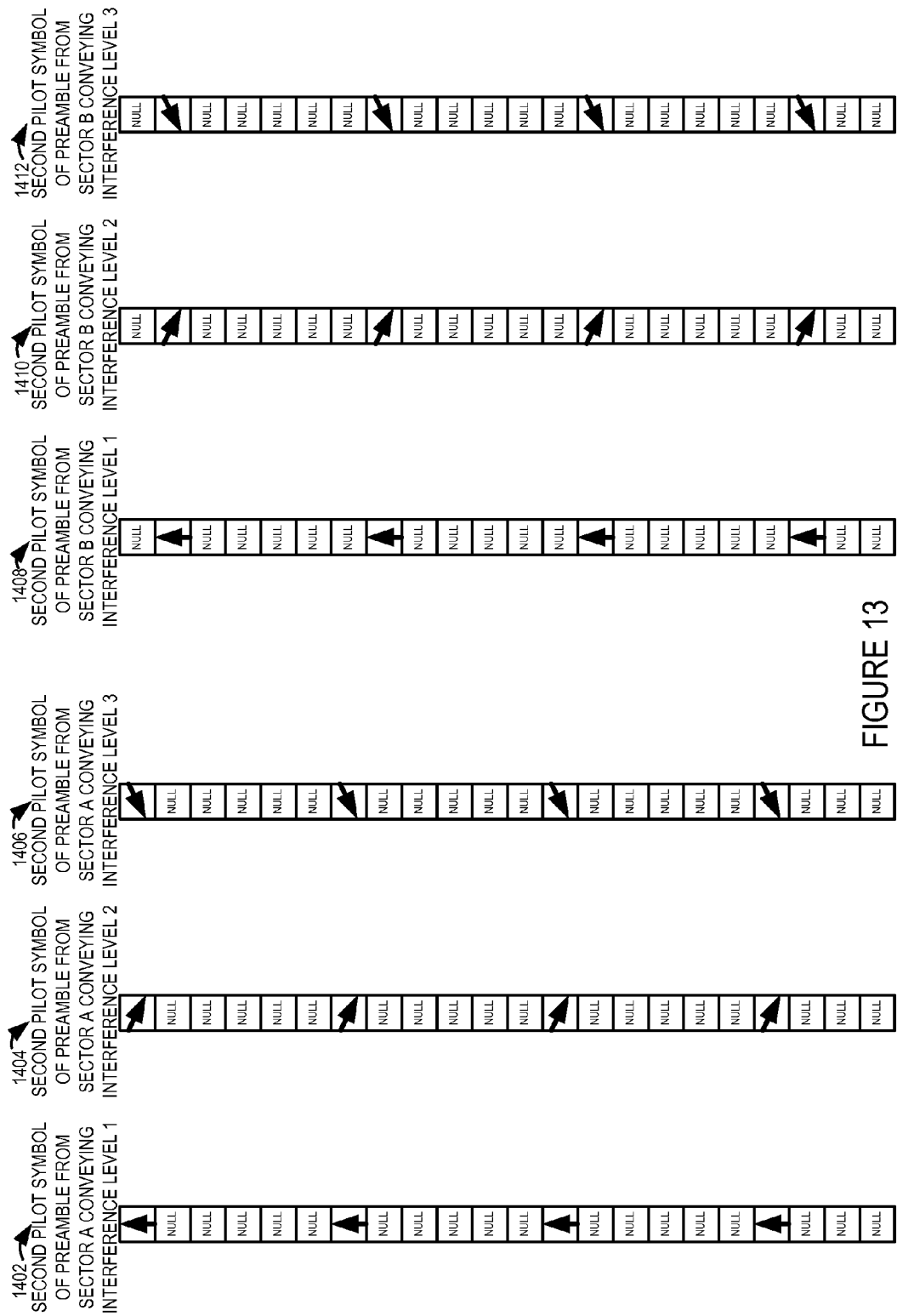
FIG. 13 is a drawing illustrating various exemplary pilot symbols used to convey interference information in accordance with another approach used in some embodiments.

FIG. 13 is a drawing illustrating various exemplary pilot symbols used to convey interference information in some embodiments. In the example of FIG. 13, the pilot symbols used to convey interference information include some sub-carriers conveying a pilot tone as indicated by an arrow and some sub-carriers with intentional nulls as indicated by NULL. In the example of FIG. 14, the pilot symbols used to convey interference information include different phase offsets corresponding to different interference levels. The different phase offsets are indicated by the direction of the pilot signal arrows. Exemplary pilot symbol 1402 is a second pilot symbol of a preamble from sector A, e.g., a first base station, conveying interference information indicating interference level 1 via a phase offset value of 0 degrees. Exemplary pilot symbol 1404 is a second pilot symbol of a preamble from sector A, e.g., the first base station, conveying interference information indicating interference level 2 via a phase offset of 120 degrees. Exemplary pilot symbol 1406 is a second pilot symbol of a preamble from sector A, e.g., the first base station, conveying interference information indicating interference level 3 via a phase offset of 240 degrees.

Exemplary pilot symbol 1408 is a second pilot symbol of a preamble from sector B, e.g., a second base station, conveying interference information indicating interference level 1 via a phase offset of 0 degrees. Exemplary pilot symbol 1410 is a second pilot symbol of a preamble from sector B, e.g., the second base station, conveying interference information indicating interference level 2 via a phase offset of 120 degrees. Exemplary pilot symbol 1412 is a second pilot symbol of a preamble from sector B, e.g., the second base station, conveying interference information indicating interference level 3 via a phase offset of 240 degrees.

In this exemplary embodiment, the location within the pilot symbol of the resources used for the pilot signals change as a function of the sector. The phase associated with the pilot symbol changes as a function of the interference level being communicated.

Some embodiments include scrambling as part of generating a pilot symbol including interference information. Such embodiments may be variations to the exemplary embodiments described with respect to FIGS. 12 and 13. For example, in some embodiments, an input pilot symbol is subjected to a scrambling sequence and multiplied by a phase offset multiplier value to generate a pilot symbol conveying interference information, and the interference information, e.g., other sector interference information, is being communicated via the selected phase offset multiplier value which is being used.

The previous description of the disclosed embodiments is provided to enable any person skilled in the art to make or use the various features. Various modifications to these embodiments will be readily apparent to those skilled in the art, and the generic principles defined herein may be applied to other embodiments without departing from the spirit or scope. Thus, the various embodiments are not intended to be limited to the embodiments shown herein but are to be accorded the widest scope consistent with the principles and novel features disclosed herein.

In various embodiments, nodes described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

In various embodiments nodes described herein are implemented using one or more modules to perform the steps corresponding to one or more methods, for example, signal processing, message generation and/or transmission steps. Some exemplary steps include transmitting a connection request, receiving a connection response, updating a set of information indicating an access point with which an access terminal has an active connection, forwarding a connection request, forwarding a connection response, determining resource assignment, requesting resources, updating resources, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access points, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a communications apparatus, the method comprising:
   measuring interference; and
   transmitting a preamble, said preamble including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information.

2. The method of claim 1, wherein transmitting a preamble further includes:
   transmitting as part of said preamble at least one symbol corresponding to a broadcast channel used to communicate system configuration information.

3. The method of claim 1, wherein said pilot symbols include acquisition pilots used for at least one of timing acquisition and sector identification.

4. The method of claim 2, wherein said preamble includes more symbols used to communicate system configuration information than interference information.

5. The method of claim 2, wherein said preamble is a superframe preamble.

6. The method of claim 5, wherein said symbols in said superframe preamble include fewer tones per symbol than symbols used to communicate data as part of a frame within a body of said superframe.

7. The method of claim 2, wherein at least two symbols are used in said preamble to communicate interference information.

8. The method of claim 7, wherein the measuring of the interference includes:
   measuring interference with respect to sectors other than a sector from which said preamble is transmitted.

9. The method of claim 1, further comprising, prior to transmitting the preamble:
   generating a first pilot in at least some subcarriers of a first OFDM pilot symbol;
   generating a second pilot in at least some subcarriers of a second OFDM pilot symbol;
   generating interference information in at least some other subcarriers of the second OFDM pilot symbol; and
   wherein said plurality of pilot symbols, included in said preamble, includes said generated first and second pilots.

10. The method of claim 9, wherein generating said second pilot includes: using a scrambling sequence that is applied to the first pilot.

11. The method of claim 10, wherein generating said second pilot further includes multiplying a scrambling sequence used to generate the second pilot by an offset.

12. The method of claim 11, wherein said offset depends on said interference information.

13. The method of claim 12, wherein said offset has unit modulus.

14. The method of claim 9, wherein transmitting a preamble includes transmitting the first OFDM pilot symbol and the second OFDM pilot symbol as adjacent OFDM symbols in said preamble.

15. The method of claim 9 further comprising:
   controlling pilot signal generation to be performed differently during an asynchronous mode of operation than during a semi-synchronous mode of operation, said second pilot signal being generated using a different function during said asynchronous mode of operation than during said semi-synchronous mode of operation.

16. The method of claim 1, wherein generating said pilot symbol further comprises:
incorporating the interference information into the at least one of said pilot symbols via a phase offset applied to multiple subcarriers.

17. The method of claim 16, wherein said phase offset is applied by performing a phase multiplication operation on an input pilot symbol which does not include interference information to generate said pilot symbol including interference information.

18. A wireless communications apparatus, the apparatus comprising:
an interference measurement module; and
a preamble generation module for generating a preamble, said preamble including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information.

19. The apparatus of claim 18, further comprising:
a wireless transmitter module for transmitting said generated preamble.

20. The apparatus of claim 18, wherein said preamble generation module includes a first symbol generation module for generating at least one symbol corresponding to a broadcast channel used to communicate system configuration information.

21. The apparatus of claim 18, wherein said preamble generation module generates pilots which are acquisition pilots used for at least one of timing acquisition and sector identification.

22. The apparatus of claim 19, wherein said preamble generation module generates more symbols used to communicate system configuration information than interference information in the generated preamble.

23. The apparatus of claim 19, wherein said preamble is a superframe preamble; and
wherein at least two symbols are used in said preamble to communicate interference information.

24. The apparatus of claim 23, wherein said interference measurement module is an other sector interference measurement module which measures interference with respect to sectors other than a sector from which said preamble is transmitted.

25. The apparatus of claim 18, wherein said preamble generation module includes:
a first pilot generation module for generating a first pilot in at least some subcarriers of a first OFDM pilot symbol;
a second pilot generation module for generating a second pilot in at least some subcarriers of a second OFDM pilot symbol;
an interference information generation module for generating interference information in at least some other subcarriers of the second OFDM pilot symbol; and
wherein said plurality of pilot symbols, included in said preamble, includes said generated first and second pilots.

26. The apparatus of claim 25, wherein said second pilot generation module generates the second pilot using a scrambling sequence that is applied to the first pilot generated by the first pilot generation module.

27. The apparatus of claim 26, wherein the second pilot generation module includes an offset module for applying an offset to a scrambling sequence used to generate the second pilot.

28. The apparatus of claim 25, wherein said transmitter transmits the first OFDM pilot symbol and the second OFDM pilot symbol as adjacent OFDM symbols in said preamble.

29. The apparatus of claim 25 further comprising:
a pilot generation mode control module for controlling the second pilot generation module to operate in one of a first and second mode of operation at a given time, said first mode corresponding to a communications apparatus asynchronous module of operation and said second mode corresponding to a communications apparatus semi-synchronous mode of operation, said second pilot generation module generating the second pilot differently during said first and second modes of operation.

30. A wireless communications apparatus, the apparatus comprising:
interference measurement means; and
means for generating a preamble, said preamble including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information.

31. The apparatus of claim 30, further comprising:
means for transmitting said generated preamble.

32. The apparatus of claim 30, wherein said means for generating includes first symbol generation means for generating at least one symbol corresponding to a broadcast channel used to communicate system configuration information.

33. The apparatus of claim 30, wherein said means for generating generates pilots which are acquisition pilots used for at least one of timing acquisition and sector identification.

34. The apparatus of claim 30, wherein said means for generating includes:
first pilot generation means for generating a first pilot in at least some subcarriers of a first OFDM pilot symbol;
second pilot generation means for generating a second pilot in at least some subcarriers of a second OFDM pilot symbol;
interference information generation means for generating interference information in at least some other subcarriers of the second OFDM pilot symbol; and
wherein said plurality of pilot symbols, included in said preamble, includes said generated first and second pilots.

35. An apparatus comprising:
a processor configured to:
measure interference,
generate a preamble, said preamble including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information, and
operate a transmitter to transmit the preamble; and
memory coupled to the processor.

36. The apparatus of claim 35, wherein said processor is further configured to:
operate the transmitter to transmit as part of said preamble at least one symbol corresponding to a broadcast channel used to communicate system configuration information.

37. The apparatus of claim 35, wherein said pilot symbols include acquisition pilots used for at least one of timing acquisition and sector identification.

38. The apparatus of claim 35, wherein said processor is further configured to, prior to the transmission of the preamble:
generate a first pilot in at least some subcarriers of a first OFDM pilot symbol;
generate a second pilot in at least some subcarriers of a second OFDM pilot symbol; generate interference information in at least some other subcarriers of the second OFDM pilot symbol; and
wherein said plurality of pilot symbols, included in said preamble, includes said generated first and second pilots.

39. The apparatus of claim 38, wherein said processor is further configured to control pilot signal generation to be performed differently during an asynchronous mode of operation than during a semi-synchronous mode of operation, said second pilot signal being generated using a different function during said asynchronous mode of operation than during said semi-synchronous mode of operation.

40. A non-transitory computer readable medium embodying machine executable instructions for controlling a communications apparatus to implement a method of communicating with another communications device, the method comprising:
measuring interference; and
transmitting a preamble, said preamble including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information.

41. The computer readable medium of claim 40, further embodying machine executable instructions for: transmitting as part of said preamble at least one symbol corresponding to a broadcast channel used to communicate system configuration information.

42. The computer readable medium of claim 40, wherein said pilot symbols include acquisition pilots used for at least one of timing acquisition and sector identification.

43. The computer readable medium of claim 40, further embodying machine executable instructions for, prior to transmitting the preamble:
generating a first pilot in at least some subcarriers of a first OFDM pilot symbol; generating a second pilot in at least some subcarriers of a second OFDM pilot symbol;
generating interference information in at least some other subcarriers of the second OFDM pilot symbol; and
wherein said plurality of pilot symbols, included in said preamble, includes said generated first and second pilots.

44. The computer readable medium of claim 43 further embodying machine executable instructions for:
controlling pilot signal generation to be performed differently during an asynchronous mode of operation than during a semi-synchronous mode of operation, said second pilot signal being generated using a different function during said asynchronous mode of operation than during said semi-synchronous mode of operation.

45. A method of operating an access terminal, the method comprising:
receiving a preamble, said preamble including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information;
recovering the interference information from the received preamble; and
controlling signal transmission based on the recovered interference information.

46. The method of claim 45, wherein recovering said interference information includes:
using preamble structure information to determine the location of said at least one pilot symbol including, interference information in said received preamble.

47. The method of claim 46, further comprising:
performing a timing acquisition operation using at least one of said pilot symbols included in the received preamble.

48. The method of claim 46, further comprising:
identifying a sector from which said received preamble was transmitted from said at least one of said pilot symbols including interference information that is included in the received preamble.

49. The method of claim 46, wherein said received preamble includes more symbols used to communicate system configuration information than interference information.

50. The method of claim 46, wherein said received preamble is a superframe preamble.

51. The method of claim 50, wherein said symbols in said superframe preamble include fewer tones per symbol than symbols used to communicate data as part of a frame within a body of said superframe.

52. The method of claim 46, wherein at least two symbols are used in said received preamble to communicate interference information; and
wherein recovering interference information from the received preamble includes recovering interference information from said at least two symbols.

53. The method of claim 52, wherein recovering interference information includes performing an unscrambling operation using a scrambling sequence that is applied to a first pilot to generate a second pilot.

54. An access terminal, comprising:
a receiver for receiving a preamble, said preamble having a preamble structure including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information;
an interference information recovery module for recovering from the plurality of pilot symbols the interference information from the received preamble based on the preamble structure; and a transmission control module for controlling signal transmission based on the recovered interference information.

55. The access terminal of claim 54, further comprising:
a memory including stored preamble structure information indicating the location of said at least one pilot symbol including interference information in a preamble; and
wherein said interference recovery module uses the stored preamble structure information to determine the location of said at least one pilot symbol including interference information in said received preamble.

56. The access terminal of claim 55, further comprising:
a timing acquisition module for performing a timing acquisition operation using at least one of said pilot symbols that is included in the received preamble.

57. The access terminal of claim 55, further comprising:
a sector identification module for identifying a sector from which said received preamble was transmitted from said at least one of said pilot symbols including interference information that is included in the received preamble.

58. The access terminal of claim 55, wherein said received preamble includes more symbols used to communicate system configuration information than interference information.

59. The access terminal of claim 55, wherein said received preamble is a superframe preamble.

60. The access terminal of claim 59, wherein said symbols in said superframe preamble include fewer tones per symbol than symbols used to communicate data as part of a frame within a body of said superframe.

61. The access terminal of claim 55, wherein at least two symbols are used in said received preamble to communicate interference information; and
wherein said interference information recovery module recovers interference information from said at least two symbols.

62. The access terminal of claim 61, wherein said interference information recovery module includes:
an unscrambling module for performing an unscrambling operation using a scrambling sequence that is applied to a first pilot to generate a second pilot.

63. An access terminal, comprising:
receiver means for receiving a preamble, said preamble having a preamble structure including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information;
means for recovering from the plurality of pilot symbols the interference information from the received preamble based on the preamble structure; and
means for controlling signal transmission based on the recovered interference information.

64. The access terminal of claim 63, further comprising:
memory means including stored preamble structure information indicating the location of said at least one pilot symbol including interference information in a preamble; and
wherein said means for recovering uses the stored preamble structure information to determine the location of said at least one pilot symbol including interference information in said received preamble.

65. The access terminal of claim 64, further comprising:
means for performing a timing acquisition operation using at least one of said pilot symbols that is included in the received preamble.

66. The access terminal of claim 64, wherein at least two symbols are used in said received preamble to communicate interference information; and
wherein said means for recovering recovers interference information from said at least two symbols.

67. The access terminal of claim 66, wherein said means for recovering includes:
means for performing an unscrambling operation using a scrambling sequence that is applied to a first pilot to generate a second pilot.

68. An apparatus comprising:
a processor configured to:
receive a preamble, said preamble having a preamble structure including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information,
recover from the plurality of pilot symbols the interference information from the received preamble based on the preamble structure, and
control signal transmission based on the recovered interference information; and
a memory coupled to the processor.

69. The apparatus of claim 68, wherein the processor is further configured to, in recovering said interference information:
use preamble structure information to determine the location of said at least one pilot symbol including interference information in said received preamble.

70. The apparatus of claim 69, wherein the processor is further configured to identify a sector from which said received preamble was transmitted from said at least one of said pilot symbols including interference information that is included in the received preamble.

71. The apparatus of claim 69, wherein at least two symbols are used in said received preamble to communicate interference information; and
wherein the processor is further configured to, in recovering interference information from the received preamble, recover interference information from said at least two symbols.

72. The apparatus of claim 71, wherein the processor is further configured to, in recovering interference information, perform an unscrambling operation using a scrambling sequence that is applied to a first pilot to generate a second pilot.

73. A non-transitory computer readable medium embodying machine executable instructions for controlling an access terminal to implement a method of communicating with another communications device, the method comprising:
receiving a preamble, said preamble including a plurality of pilot symbols, at least one of said pilot symbols including interference information, wherein the at least one of said pilot symbols including the interference information is scrambled by applying the same scrambling sequence bits, in value and number, that are applied to at least one other pilot symbol among the plurality of pilot symbols included in said preamble that does not include the interference information;

recovering the interference information from the received preamble; and controlling signal transmission based on the recovered interference information.

74. The computer readable medium of claim 73, further embodying machine executable instructions for:

using preamble structure information to determine the location of said at least one pilot symbol including interference information in said received preamble.

75. The computer readable medium of claim 74, further embodying machine executable instructions for:

identifying a sector from which said received preamble was transmitted from said at least one of said pilot symbols including interference information that is included in the received preamble.

76. The computer readable medium of claim 74, wherein at least two symbols are used in said received preamble to communicate interference information; and further embodying machine executable instructions for, in recovering interference information from the received preamble, recovering interference information from said at least two symbols.

77. The computer readable medium of claim 76, further embodying machine executable instructions for, in recovering interference information, performing an unscrambling operation using a scrambling sequence that is applied to a first pilot to generate a second pilot.

78. The method of claim 1, wherein the scrambling sequence applied to the at least one and the at least one other pilot symbols is generated from a PilotPhase quantity.

\* \* \* \* \*